(12) United States Patent
Sugano

(10) Patent No.: US 7,165,021 B2
(45) Date of Patent: Jan. 16, 2007

(54) CHINESE LANGUAGE INPUT SYSTEM

(75) Inventor: Jin Sugano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1187 days.

(21) Appl. No.: 09/968,010

(22) Filed: Oct. 2, 2001

(65) Prior Publication Data
US 2002/0194001 A1 Dec. 19, 2002

(30) Foreign Application Priority Data
Jun. 13, 2001 (JP) ............... 2001-179120

(51) Int. Cl.
G06F 17/20 (2006.01)
(52) U.S. Cl. ............ 704/8; 704/2; 704/3; 715/535
(58) Field of Classification Search ........... 704/2–8; 715/535
See application file for complete search history.

(56) References Cited

U.S. PATENT DOCUMENTS

| 5,331,557 | A | * | 7/1994 | Liu | 715/535 |
| 5,786,776 | A | * | 7/1998 | Kisaichi et al. | 341/23 |
| 6,307,541 | B1 | * | 10/2001 | Ho et al. | 345/171 |
| 6,356,258 | B1 | * | 3/2002 | Kato et al. | 345/168 |
| 6,562,078 | B1 | * | 5/2003 | Yang et al. | 715/535 |
| 6,809,725 | B1 | * | 10/2004 | Zhang | 345/171 |
| 6,982,658 | B1 | * | 1/2006 | Guo | 341/28 |

* cited by examiner

Primary Examiner—Abul Azad
Assistant Examiner—Lamont Spooner
(74) Attorney, Agent, or Firm—Staas & Halsey LLP

(57) ABSTRACT

Initials of the Chinese language are classified into nine initial groups. The first touch of a numeric key of a cellular phone selects an initial group including the initial of the desired syllable for input. The second touch of a numeric key selects one of initial-final groups, each including an initial and one of five final groups. These final groups comprise a simple final group and four types of complex final groups. The third touch of a numeric key specifies a final to determine the desired syllable.

19 Claims, 23 Drawing Sheets

| CAP1 | CAP2 | CAP3 |
|---|---|---|
| SML1 | SML2 | SML3 |
| SYM1 | SYM2 | SYM3 |
| DBL/SGL | NUM | |

FIG. 3

| 1 | 2 | 3 |
|---|---|---|
| 4 | 5 | 6 |
| 7 | 8 | 9 |
| * | 0 | # |

| bp | mf | dt |
|---|---|---|
| nl | gkh | jzhz |
| qchc | xshs | ryw |
| | SYM | |

| button | alternative | pointer |
|---|---|---|
| 1 | b ? | D 1 1 |
| 2 | b * | D 1 2 |
|  |  |  |
| 9 |  | D 1 9 |

D2

| button | alternative | pointer |
|---|---|---|
| 1 | m ? | D 2 1 |
| 2 | m * | D 2 2 |
|  |  |  |
| 9 |  | D 2 9 |

D9

| button | alternative | pointer |
|---|---|---|
| 1 | r ? | D 9 1 |
| 2 | r * | D 9 2 |
|  |  |  |
| 9 |  | D 9 9 |

| b? | b* | bi* |
|---|---|---|
| p? | p* | pi* |
|  |  |  |
|  |  |  |

(D2)···mf

| m? | m* | mi* |
|---|---|---|
| f? | f* |  |
|  |  |  |
|  |  |  |

(D3)···dt

| d? | d* | di* |
|---|---|---|
| du* | t? | t* |
| ti* | tu* |  |
|  |  |  |

(D4)···nl

| n? | n* | ni* |
|---|---|---|
| nu/v* | l? | l* |
| li* | lu/v* |  |
|  |  |  |

(D5)···gkh

| g? | g* | gu* |
|---|---|---|
| k? | k* | ku* |
| h? | h* | hu* |
|  |  |  |

(D6)···jzhz

| j? | ji* | ju* |
|---|---|---|
| zh? | zh* | zhu* |
| z? | z* | zu* |
|  |  |  |

(D7)···qchc

| q? | qi* | qu* |
|---|---|---|
| ch? | ch* | chu* |
| c? | c* | cu* |
|  |  |  |

(D8)···xshs

| x? | xi* | xu* |
|---|---|---|
| sh? | sh* | shu* |
| s? | s* | su* |
|  |  |  |

(D9)···ryw

| r? | r* | ru* |
|---|---|---|
| ? | * | y* |
| w* | yu* |  |
|  |  |  |

| button | final | syllable |
|---|---|---|
| 1 | a | b a |
| 2 | o | b o |
|  |  |  |
| 0 |  |  |

D91

| button | final | syllable |
|---|---|---|
| 1 |  |  |
| 2 |  |  |
|  |  |  |
| 0 |  |  |

D12

| button | final | syllable |
|---|---|---|
| 1 | a i | b a i |
| 2 | e i | b e i |
|  |  |  |
| 0 |  |  |

D92

| button | final | syllable |
|---|---|---|
| 1 |  |  |
| 2 |  |  |
|  |  |  |
| 0 |  |  |

D19

| button | final | syllable |
|---|---|---|
| 1 |  |  |
| 2 |  |  |
|  |  |  |
| 0 |  |  |

D99

| button | final | syllable |
|---|---|---|
| 1 |  |  |
| 2 |  |  |
|  |  |  |
| 0 |  |  |

| ba | bo | |
|---|---|---|
| bi | bu | |
| | | |
| | | |

(D12)···b*

| bai | bei | bao |
|---|---|---|
| | ban | ben |
| bang | beng | |
| | | |

(D13)···bi*

| | bie | biao |
|---|---|---|
| | bian | bin |
| | bing | |
| | | |

(D14)···p?

| pa | po | |
|---|---|---|
| pi | pu | |
| | | |
| | | |

(D15)···p*

| pai | pei | pao |
|---|---|---|
| pou | pan | pen |
| pang | peng | |
| | | |

(D16)···pi*

| | pie | piao |
|---|---|---|
| | pian | pin |
| | ping | |
| | | |

| ma | mo | me |
|----|----|----|
| mi | mu |    |
|    |    |    |
|    | m  |    |

(D22)···m*

| mai  | mei  | mao |
|------|------|-----|
| mou  | man  | men |
| mang | meng |     |
|      |      |     |

(D23)···mi*

|     | mie  | miao |
|-----|------|------|
| miu | mian | min  |
|     | ming |      |
|     |      |      |

(D24)···f?

| fa | fo |   |
|----|----|---|
|    | fu |   |
|    |    |   |
|    |    |   |

(D25)···f*

|      | fei  |     |
|------|------|-----|
| fou  | fan  | fen |
| fang | feng |     |
|      |      |     |

| da |  | de |
|---|---|---|
| di | du |  |
|  |  |  |
|  |  |  |

(D32)···d*

| dai | dei | dao |
|---|---|---|
| dou | dan |  |
| dang | deng | dong |
|  |  |  |

(D33)···di*

| dia | die | diao |
|---|---|---|
| diu | dian |  |
|  | ding |  |
|  |  |  |

(D34)···du*

|  | duo |  |
|---|---|---|
| dui | duan | dun |
|  | (dong) |  |
|  |  |  |

(D35)···t?

| ta |  | te |
|---|---|---|
| ti | tu |  |
|  |  |  |
|  |  |  |

(D36)···t*

| tai | tei | tao |
|---|---|---|
| tou | tan |  |
| tang | teng | tong |
|  |  |  |

(D37)···ti*

|  | tie | tiao |
|---|---|---|
|  | tian |  |
|  | ting |  |
|  |  |  |

(D38)···tu*

|  | tuo |  |
|---|---|---|
| tui | tuan | tun |
|  | (tong) |  |
|  |  |  |

| na |  | ne |
|---|---|---|
| ni | nu | nv |
|  |  |  |
|  | n |  |

(D42)···n*

| nai | nei | nao |
|---|---|---|
| nou | nan | nen |
| nang | neng | nong |
|  |  |  |

(D43)···ni*

|  | nie | niao |
|---|---|---|
| niu | nian | nin |
| niang | ning |  |
|  |  |  |

(D44)···nu/v*

|  | nuo |  |
|---|---|---|
| nve | nuan |  |
|  | (nong) |  |
|  |  |  |

(D45)···l?

| la | lo | le |
|---|---|---|
| li | lu | lv |
|  |  |  |
|  |  |  |

(D46)···l*

| lai | lei | lao |
|---|---|---|
| lou | lan |  |
| lang | leng | long |
|  |  |  |

(D47)···li*

| lia | lie | liao |
|---|---|---|
| liu | lian | lin |
| liang | ling |  |
|  |  |  |

(D48)···lu/v*

|  | luo |  |
|---|---|---|
| lve | luan | lun |
|  | (long) |  |
|  |  |  |

| ga |  | ge |
|---|---|---|
|  | gu |  |
|  |  |  |
|  |  |  |

(D52)···g*

| gai | gei | gao |
|---|---|---|
| gou | gan | gen |
| gang | geng | gong |
|  |  |  |

(D53)···gu*

| gua | guo | guai |
|---|---|---|
| gui | guan | gun |
| guang | (gong) |  |
|  |  |  |

(D54)···k?

| ka |  | ke |
|---|---|---|
|  | ku |  |
|  |  |  |
|  |  |  |

(D55)···k*

| kai | kei | kao |
|---|---|---|
| kou | kan | ken |
| kang | keng | kong |
|  |  |  |

(D56)···ku*

| kua | kuo | kuai |
|---|---|---|
| kui | kuan | kun |
| kuang | (kong) |  |
|  |  |  |

(D57)···h?

| ha |  | he |
|---|---|---|
|  | hu |  |
|  |  |  |
|  |  |  |

(D58)···h*

| hai | hei | hao |
|---|---|---|
| hou | han | hen |
| hang | heng | hong |
|  | hng |  |

(D59)···hu*

| hua | huo | huai |
|---|---|---|
| hui | huan | hun |
| huang | (hong) |  |
|  |  |  |

| (jia) | | |
|---|---|---|
| ji | ju | (ju) |
| | | |
| | | |

(D62)···ji*

| jia | jie | jiao |
|---|---|---|
| jiu | jian | jin |
| jiang | jing | jiong |
| | | |

(D63)···ju*

| | | |
|---|---|---|
| jue | juan | jun |
| | (jiong) | |
| | | |

(D64)···zh?

| zha | | zhe |
|---|---|---|
| zhi | zhu | |
| (zhi) | | |
| | | |

(D65)···zh*

| zhai | zhei | zhao |
|---|---|---|
| zhou | zhan | zhen |
| zhang | zheng | zhong |
| | | |

(D66)···zhu*

| zhua | zhuo | zhuai |
|---|---|---|
| zhui | zhuan | zhun |
| zhuang | (zhong) | |
| | | |

(D67)···z?

| za | | ze |
|---|---|---|
| zi | zu | |
| (zi) | | |
| | | |

(D68)···z*

| zai | zei | zao |
|---|---|---|
| zou | zan | zen |
| zang | zeng | zong |
| | | |

(D69)···zu*

| | zuo | |
|---|---|---|
| zui | zuan | zun |
| | (zong) | |
| | | |

| (qia) | | |
|---|---|---|
| qi | qu | (qu) |
| | | |
| | | |

(D72)···qi*

| qia | qie | qiao |
|---|---|---|
| qiu | qian | qin |
| qiang | qing | qiong |
| | | |

(D73)···qu*

| | | |
|---|---|---|
| que | quan | qun |
| | (qiong) | |
| | | |

(D74)···ch?

| cha | | che |
|---|---|---|
| chi | chu | |
| (chu) | | |
| | | |

(D75)···ch*

| chai | | chao |
|---|---|---|
| chou | chan | chen |
| chang | cheng | chong |
| | | |

(D76)···chu*

| | chuo | chuai |
|---|---|---|
| chui | chuan | chun |
| chuang | (chong) | |
| | | |

(D77)···c?

| ca | | ce |
|---|---|---|
| ci | cu | |
| (cu) | | |
| | | |

(D78)···c*

| cai | | cao |
|---|---|---|
| cou | can | cen |
| cang | ceng | cong |
| | | |

(D79)···cu*

| | cuo | |
|---|---|---|
| cui | cuan | cun |
| | (cong) | |
| | | |

| (xia) | | |
|---|---|---|
| xi | xu | (xu) |
| | | |
| | | |

(D82)···xi*

| xia | xie | xiao |
|---|---|---|
| xiu | xian | xin |
| xiang | xing | xiong |
| | | |

(D83)···xu*

| | | |
|---|---|---|
| xue | xuan | xun |
| | (xiong) | |
| | | |

(D84)···sh?

| sha | | she |
|---|---|---|
| shi | shu | |
| (shi) | | |
| | | |

(D85)···sh*

| shai | shei | shao |
|---|---|---|
| shou | shan | shen |
| shang | sheng | |
| | | |

(D86)···shu*

| shua | shuo | shuai |
|---|---|---|
| shui | shuan | shun |
| shuang | | |
| | | |

(D87)···s?

| sa | | se |
|---|---|---|
| si | su | |
| (si) | | |
| | | |

(D88)···s*

| sai | | sao |
|---|---|---|
| sou | san | sen |
| sang | seng | song |
| | | |

(D89)···su*

| | suo | |
|---|---|---|
| sui | suan | sun |
| | (song) | |
| | | |

|  |  | re |
|---|---|---|
| ri | ru |  |
| (ri) |  |  |
|  |  |  |

(D92)···r*

|  |  | rao |
|---|---|---|
| rou | ran | ren |
| rang | reng | rong |
|  |  |  |

(D93)···ru*

|  | ruo |  |
|---|---|---|
| rui | ruan | run |
|  | (rong) |  |
|  |  |  |

(D94)···?

| a | o | e |
|---|---|---|
| yi | wu | yu |
| ^e |  |  |
|  | er |  |

(D95)···*

| ai | ei | ao |
|---|---|---|
| ou | an | en |
| ang | eng | ong |
|  | ng |  |

(D96)···y*

| ya | ye | yao |
|---|---|---|
| you | yan | yin |
| yang | ying | yong |
|  | yo |  |

(D97)···w*

| wa | wo | wai |
|---|---|---|
| wei | wan | wen |
| wang | weng |  |
|  |  |  |

(D98)···yu*

|  |  |  |
|---|---|---|
| yue | yuan | yun |
|  | (yong) |  |
|  |  |  |

FIG. 20

| syllable | initial selecting stage | initial-final selecting stage | final selecting stage |
|---|---|---|---|
| m | m f | m ? | exception (0) |
| n | n l | n ? | exception (0) |
| h n g | g k h | h * | exception (0) |
| n g | r y w | * | exception (0) |
| y o | r y w | y * | exception (0) |

FIG. 21

CHINESE LANGUAGE INPUT SYSTEM

BACKGROUND OF THE INVENTION

1. Field of the Invention

This invention relates to a system for inputting the Chinese language via limited number of keys. The present disclosure relates to subject matter contained in Japanese Patent application No. 2001-179120 (filed on Jun. 13, 2001), which is expressly incorporated herein by reference in its entirety.

2. Description of the Related Art

Among conventionally known methods for inputting Chinese words is one in which Chinese syllables are entered in Pinyin and then converted into Chinese characters. Every Chinese character is composed of a single syllable, which is transcribed into one to six letters of the English alphabet. With a keyboard having 26 keys corresponding to the 26 letters in the English alphabet, the input of a single syllable therefore requires one to six keystrokes.

Chinese phonemes have a dimension of tones. The basic tones in Mandarin Chinese are composed of four types of tones, or first, second, third, and fourth tones. Hereinafter, it is assumed that ones referred to simply as "syllables" include no tonic factor. Syllables including tonic factors will be referred to as "syllables with tones." According to the method, Chinese characters are converted based on "syllables" or "syllables with tones."

A Chinese syllable is divided into two parts, an initial corresponding to a consonant and a final corresponding to a vowel. In this connection, a final may include any semi-vowel preceding its vowel, and any consonant following its vowel. According to another method for input, the initial and final are each input by a single keystroke each so that a total of two keystrokes determine a syllable. The method, however, requires a keyboard having thirty-odd keys for the sake of entering initials and finals.

Aside from the methods using a keyboard with a number of keys as described above, another method has been developed. The method requires only about ten keys, such as those of a numeric keypad. This aims to meet the demands of inputting Chinese words in cellular phones, which have become prevalent in recent years.

In the conventional numeric-key-based input method, a single Chinese character is input by the following manner. The first keystroke selects a group of initials, the second keystroke selects the first letter of a final, and the third keystroke selects final(s). Note that at the third keystroke, some keys are allocated for a plurality of finals each. At the fourth keystroke or after, the user selects a desired one from many Chinese characters whose syllables are defined by selected initials and selected final(s).

However, according to the conventional technology of inputting Chinese characters through some ten keys, three keystrokes are insufficient to define a syllable. That only extracts many alternative syllables. The syllables hence correspond to many characters. Because the number of characters is fatally large, the user must select a desired character from many alternative characters. This procedure is very complicated for the user.

Because the number of syllables used in the standard Mandarin Chinese is around 400, a three-digit sequence number is sufficient to be assigned to every syllable. With this sequence number, another method for input can be presumed. According to the method, three keystrokes, each entering a digit by a numeric key, define a syllable. The method, however, requires the users to memorize every sequence number assigned to the corresponding syllable. This method is out of touch with reality.

SUMMARY OF THE INVENTION

It is an object of the present invention to provide a program product, an apparatus and a method for defining a Chinese syllable with three keystrokes of a limited number of keys to realize user-friendly input of the Chinese language.

The Chinese language input program according to the present invention employs the following configuration to accomplish the above object. The program comprises code segments to control a computer to execute following steps.

The steps comprise a first presentation step of presenting initial groups into which initials of the Chinese language are classified; an initial group specifying step of specifying one of the initial groups; a second presentation step of presenting initial-final groups, each including both an initial in the specified initial group and a final group including finals able to be used with the initial; an initial-final group specifying step of specifying one of the initial-final groups; a third presentation step of presenting syllable definition information including finals in the specified initial-final group; and a syllable definition step of defining a syllable for input by specifying one of the finals in the syllable definition information.

The initial groups, the initial-final groups, and the syllable definition information may be displayed on-screen with phonetic symbols for transcribing the Chinese pronunciation. The phonetic symbols may be used in accordance with Pinyin, Bopomofo, or the Wade system. The program according to the present invention is applicable to various types of information equipment, such as cellular phones and personal digital assistants, each having a microcomputer equivalent to a controller and keys whose number is about 10.

BRIEF DESCRIPTION OF THE DRAWINGS

The invention will be described below in detail with reference to the accompanying drawings, in which:

FIG. 3 is a schematic view of the second displaying part at the alphanumeric input mode;

FIG. 4 is a schematic view of the second displaying part at the alphanumeric input mode;

FIG. 5 is a schematic view of the second displaying part at the Chinese input (selecting an initial) mode;

FIG. 6 is a table showing syllables used in the standard Mandarin Chinese;

FIG. 9 is a schematic diagram showing initial-final tables;

FIG. 10 is a schematic diagram showing views of the second displaying part at the initial-final selecting stage;

FIG. 11 is a schematic diagram showing syllable tables;

FIG. 12 is a schematic diagram showing views of the second displaying part at the final selecting stage;

FIG. 13 is a schematic diagram showing views of the second displaying part at the final selecting stage;

FIG. 14 is a schematic diagram showing views of the second displaying part at the final selecting stage;

FIG. 15 is a schematic diagram showing views of the second displaying part at the final selecting stage;

FIG. 16 is a schematic diagram showing views of the second displaying part at the final selecting stage;

FIG. 17 is a schematic diagram showing views of the second displaying part at the final selecting stage;

FIG. 18 is a schematic diagram showing views of the second displaying part at the final selecting stage;

FIG. 19 is a schematic diagram showing views of the second displaying part at the final selecting stage;

FIG. 20 is a schematic diagram showing views of the second displaying part at the final selecting stage;

FIG. 21 is a schematic diagram showing procedures for inputting special syllables;

DETAILED DESCRIPTION OF THE PREFERRED EMBODIMENTS

Figure 1:
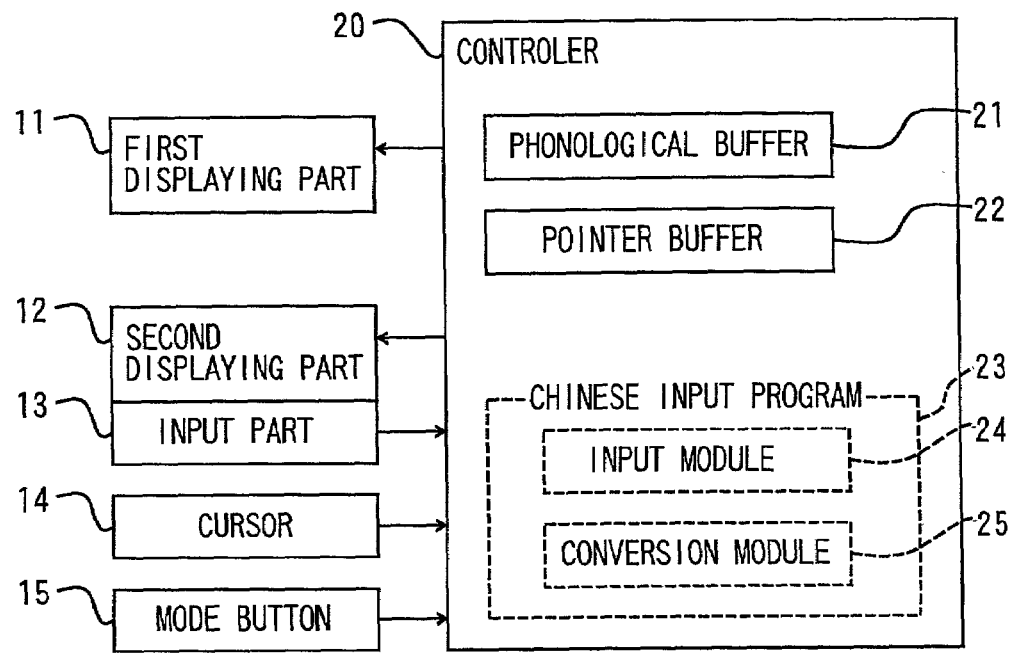
FIG. 1 is a block diagram schematically showing the architecture for input of the Chinese language according to an embodiment of the present invention.
Figure 2:
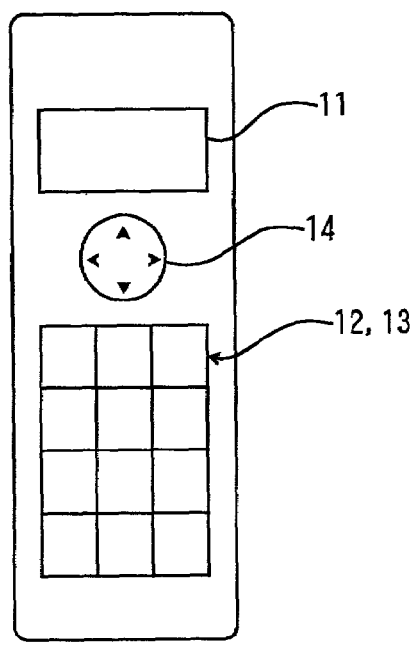
FIG. 2 is a schematic diagram showing the appearance of a cellular phone with a touch pad.

The present invention will be explained below with reference to the accompanying drawings in accordance with the embodiments. FIG. 1 is a block diagram schematically showing a cellular phone's configuration relating to the process for inputting the Chinese language. FIG. 2 is a schematic diagram showing the appearance of the cellular phone.

This cellular phone comprises a first displaying part 11, a second displaying part 12, an input part 13, a cursor 14, a mode button 15, and a controller 20. The first displaying part 11 is composed of a display device such as a liquid crystal display, and is able to display characters, numerals and other symbols. The second displaying part 12 is composed of a display device such as a liquid crystal display. On the surface of the displaying part 12 the input part 13, which is composed of a transparent touch pad, is provided. The cursor 14 acquires designations toward four directions, or upward, downward, left, and right. The mode button 15 is used for changing input modes. These modes are a phone number mode for inputting a digit with a keystroke, an alphanumeric mode for inputting an alphanumeric letter with two keystrokes, and a Chinese mode for inputting a Chinese character with three keystrokes to be described later.

The controller 20 is connected to each of the first displaying part 11, the second displaying part 12, the input part 13, the cursor 14, and the mode button 15. This controller 20 can display desired letters or characters on the first displaying part 11. The screen of the second displaying part 12 is sectioned into four rows and three columns of rectangular regions. The controller 20 displays desired numerals, other symbols, or characters on the respective rectangular regions.

When the input part 13 is depressed, the controller 20 detects which region at the input part 13 is pressed. This enables the controller 20, when the user presses a region of the input part 13 corresponding to that of the displaying part 12, to detect which region is pressed. Thus, the rectangular regions are used as independent buttons (keys).

The controller 20 further comprises a phonological buffer 21 and a pointer buffer 22, which are capable of storing data. The phonological buffer 21 is used for obtaining input history of the input part 13 in the Chinese mode. The information stored in the buffer 21 is also used for returning the processing to the previous step when a back key is pressed. Further, the controller 20 has a ROM (Read Only Memory) as a storing device in which a Chinese input program 23 is stored. The Chinese input program 23 comprises an input module 24 and a conversion module 25.

This cellular phone has a wireless transmitting and receiving part, a microphone, and a speaker so that the user can make a call as with an ordinary cellular phone. Besides, the user can input text data including alphanumeric letters and Chinese characters into the cellular phone for email.

The alphanumeric letters and the Chinese characters are input at the alphanumeric mode and the Chinese mode, respectively. The user operates the mode button 15 to change the alphanumeric and Chinese modes. The controller 20 acquires the alphanumeric letters in the alphanumeric mode, and the Chinese characters in the Chinese mode.

FIGS. 3 and 4 are schematic views of the second displaying part 12 in the alphanumeric input mode. When the alphanumeric mode is set by the mode button 15 being pushed, the displaying part 12 is set as shown in FIG. 3. When the "NUM" button in the FIG. 3 is pressed, the controller 20 changes the screen to the state shown in FIG. 4. In FIG. 4 the numerals "1," "2," "3," "4," "5," "6," "7," "8," "9" and "0," and symbols "*" and "#" are displayed. Note that in the phone number mode the displaying part 12 is also set as shown in FIG. 4.

FIG. 5 is a schematic view of the second displaying part 12 in the Chinese input mode. Note that FIG. 5 illustrates the displaying part 12 at the initial selecting stage, which will be described later. When the Chinese mode is set by the mode button 15 being pushed, the displaying part 12 enters a state shown in FIG. 5. Then the user can input desired syllables each with three keystrokes.

Figure 6:
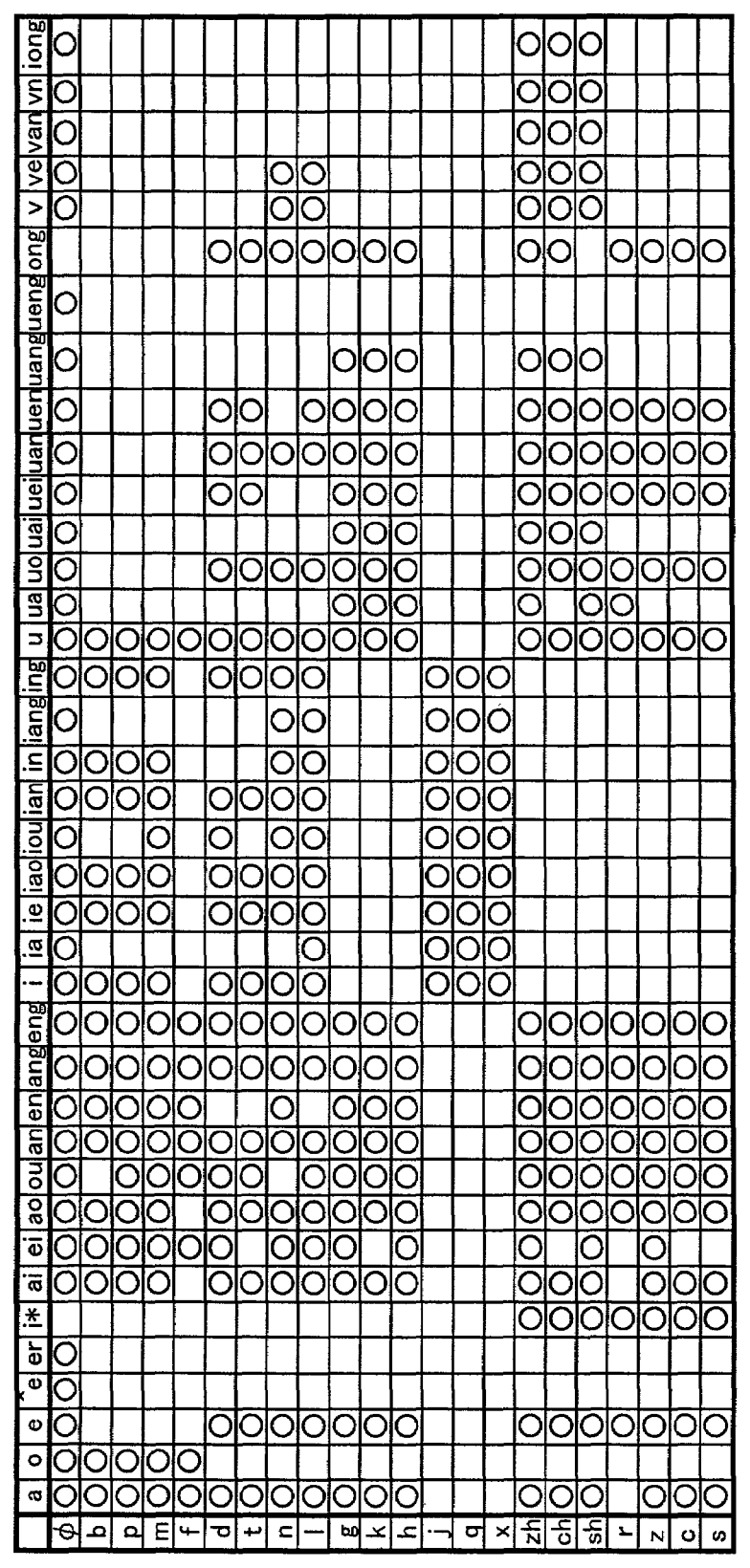

The input of the Chinese language will be described bellow in detail. FIG. 6 is a table of syllables used in the standard Mandarin Chinese. In the table, each row corresponds to an initial, and each column corresponds to a final. A syllable is defined by an initial selected from the rows and a final selected from the columns. Note that the row of the empty set symbol "φ" is for the syllables each composed of a final without any initial. The empty set symbol "φ" corresponds to the zero initial in Chinese phonology.

Not all the syllables given by the combinations of the rows and columns in FIG. 6 are used in the standard Mandarin Chinese. More specifically, among those shown in FIG. 6, only 403 syllables, which are marked with a circle, are used. The syllables in the empty boxes are not in use. Almost every syllable normally used in the standard Mandarin Chinese corresponds to one of those 403 syllables. Nevertheless, there are special syllables for use. The special syllables cannot be transcribed by the combination of a row and a column in FIG. 6. The special syllables are m, n, hng, ng and yo(io). With these special syllables, all the syllables corresponding to the characters prescribed in GB2312 are transcribed if the characters are pronounced in accordance with the standard pronunciation of Mandarin Chinese.

As shown in FIG. 6, Mandarin Chinese has more than 20 initials and more than 30 finals. Consequently, if the input part 13 provides only about 10 keys, a touch of a key is insufficient to specify either an initial or a final.

In the present embodiment, the initials are classified into nine initial groups, and the finals are classified into five final groups. With the first touch of a key, one of the initial groups is selected. With the second touch of a key, an initial is specified and one of the final groups is selected. With the third touch of a key, a final is selected to define a syllable. In other words, a syllable is determined with the first touch (keystroke) corresponding to an initial selecting stage for selecting an initial group, the second touch (keystroke) corresponding to an initial-final selecting stage for both specifying an initial and selecting a final group, and the third touch (keystroke) corresponding to a final selecting stage.

Figure 7:
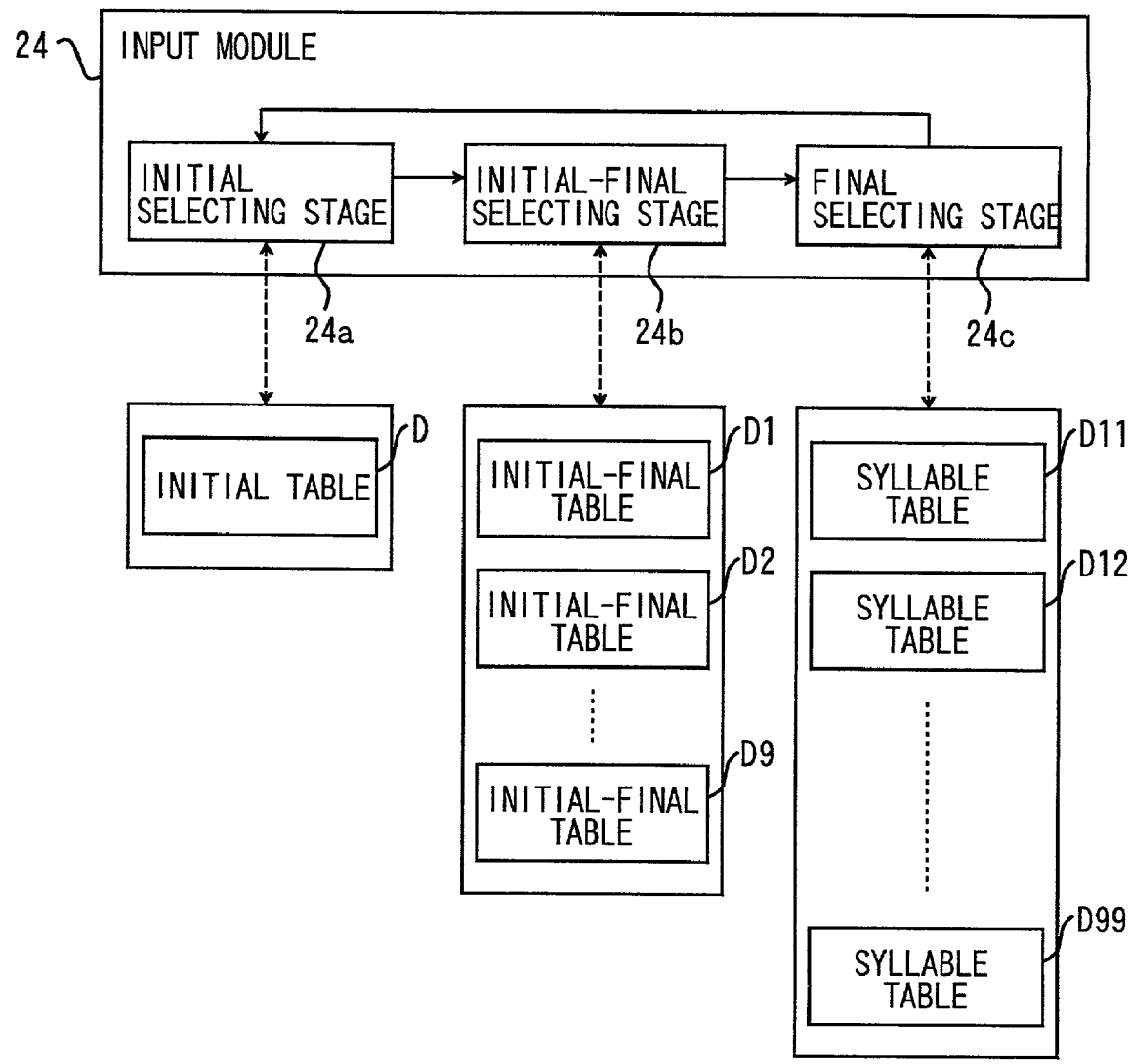
FIG. 7 is a schematic diagram showing the configuration of the input module of the Chinese language input program.

FIG. 7 is a schematic diagram showing the configuration of the input module 24 of the Chinese language input program 23. The input module 24 includes code segments corresponding to the initial selecting stage 24a, the initial-final selecting stage 24b, and the final selecting stage 24c, respectively. The initial selecting stage 24a corresponds to the first presentation step and the initial group specifying step. The initial-final selecting stage 24b corresponds to the second presentation step and the initial-final group specifying step. The final selecting stage 24c corresponds to the third presentation step and the syllable definition step.

Further, there are stored an initial table D, initial-final tables D1–D9, and syllable tables D11–D99 in the ROM of the controller 20. The initial table D is referred at the initial selecting stage 24a, the initial-final tables D1–D9 are referred at the initial-final selecting stage 24b, and the syllable tables D11–D99 are referred at the final selecting stage 24c.

Figure 8:
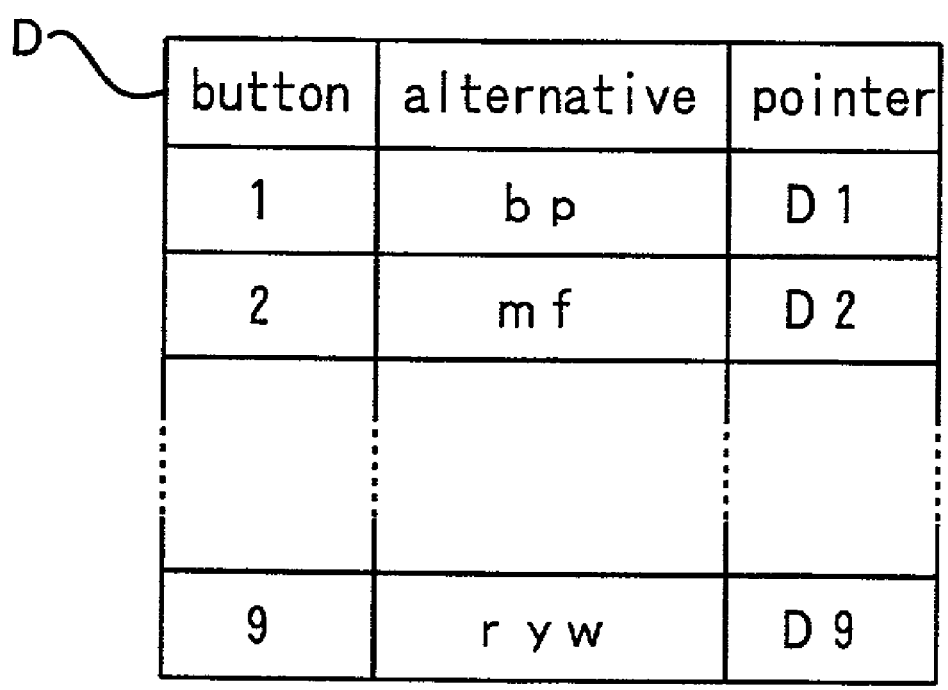
FIG. 8 is a schematic diagram showing the initial table.

FIG. 8 is a schematic diagram showing the initial table D, which includes records each having "button," "alternative," and "pointer" fields. In the "button" fields, numerals corresponding to "1," "2," "3," . . . , shown as buttons in FIG. 4, are stored.

The records in the initial table D correspond to the initial groups, respectively. In the "alternative" field of the record, a string is stored of letters representing the corresponding initial group. In the "pointer" field of the record, a pointer to one of the initial-final groups D1–D9 is stored. Note that at the initial-final selecting stage 24b only one of the initial-final groups D1–D9 is referred. In other words, the "pointer" in the record corresponding to the initial group, selected at the initial selecting stage 24a, designates one of the initial-final tables D1–D9.

The initial group is further described bellow. The initials are classified into the first initial group including b and p, the second initial group including m and f, the third initial group including d and t, the forth initial group including n and l, the fifth initial group including g, k and h, the sixth initial group including j, zh and z, the seventh initial group including q, ch and c, the eighth initial group including x, sh, and s, and the ninth initial group including r and the zero initial.

It should be noted that certain syllables with the zero initial are transcribed in accordance with Pinyin as follows. Syllables composed solely of a final in which the first letter is i or v are transcribed into groups of letters in which the first letter is represented as y. And syllables composed solely of a final in which the first letter is u are transcribed into groups of letters in which the first letter is represented as w. Note that according to Pinyin the letter v is equivalent to an umlaut u, and therefore the syllables composed solely of a final in which the first letter is v are represented in this embodiment of the present invention as having yu as the first two letters.

As shown in FIG. 5, in the respective positions where 1, 2, 3, 4, 5, 6, 7, 8, 9, and 0 are displayed in FIG. 4, "bp," "mf," "dt," "nl," "gkh," "jzhz," "qchc," "xshs," "ryw," and "SYM" are displayed. The "bp," "mf," "dt," "nl," "gkh," "jzhz," "qchc," "xshs" and "ryw" buttons correspond to the first through ninth initial groups, respectively. The user selects one of the initial groups with the first touch of a button. Note that for input of a syllable composed solely of a final, the "ryw" button should be pushed.

After the first touch of the button completes the initial selecting stage 24a, the initial-final selecting stage is executed. In the initial-final selecting stage 24b, one of the initial-final tables D1–D9 is referred. FIG. 9 is a schematic diagram showing the initial-final tables D1–D9, each having a plurality of records. Each record in the table has "button," "alternative," and "pointer" fields.

In the "button" fields, numerals corresponding respectively to the buttons "1," "2," "3," . . . , displayed in FIG. 4, are stored. In the "alternative" field, a string is stored of letters corresponding to both an initial and a final group. In the "pointer" field, a pointer to one of the syllable tables D11–D99 is stored. Note that at the final selecting stage 24c only one of the syllable tables D11–D99 is referred. More specifically, the "pointer" in the record, selected at the initial-final selecting stage 24b, designates one of the syllable tables D11–D99.

The initial-final tables D1–D9 are created in accordance with the method of this invention for classifying initials. The method for classifying initials is described bellow. This method is newly developed, based on the statistics and analysis of data on the Chinese language in order to restrict the number of final groups to 10 or less, with the previous method according to the Chinese phonetics being fully adopted.

The finals are classified into simple finals, which are each transcribed into a letter of the alphabet, and complex finals, which are each transcribed into a plurality of letters of the alphabet. The classifying method of this invention further classifies the complex finals into four groups. In other words, with this classifying method, finals are classified into the first final group, composed of the simple finals, and second to fifth final groups, composed of the complex finals.

The second final group is composed of complex finals which are each transcribed into groups of letters in which the first letter is a, e, or o in Pinyin. The third final group is composed of complex finals which are each transcribed into groups of letters in which the first letter is i or y in Pinyin. The fourth final group is composed of complex finals which are each transcribed into groups of letters in which the first letter is u or w in Pinyin. The fifth final group is composed of complex finals which are each transcribed into groups of letters in which the first letter is v or the first letters are yu in Pinyin. According to this embodiment, the first to fifth final groups are symbolized by "?", "*", "i* or y*", "u* or w*", and "v* and yu*", respectively. The alternative symbol representations of the third through fifth groups (y*, w*, and yu*) are used when the respective complex finals have the zero initial.

FIG. 10 is a schematic diagram showing views of the second displaying part 12 at the initial-final selecting stage 24b. After a touch of a button displayed in FIG. 5 completes the initial selecting stage 24a, one of screens (D1)–(D9) in FIG. 10 is displayed on the displaying part 12 at the initial-final selecting stage 24b.

More specifically, when the button pushed at the initial selecting stage 24a is "bp" in FIG. 5, the screen (D1) in FIG. 10 is displayed on the displaying part 12. According to the screen (D1) in FIG. 10, in the positions where 1, 2, 3, 4, 5, and 6 are displayed in FIG. 4, "b?," "b*," "bi*," "p?," "p*," and "pi*" are displayed, respectively.

When the button pushed at the initial selecting stage 24a is "mf" in FIG. 5, the screen (D2) in FIG. 10 is displayed on the displaying part 12. According to the screen (D2) in FIG. 10, in the positions where 1, 2, 3, 4, and 5 are displayed in FIG. 4, "m?," "m*," "mi*," "f?," and "f*" are displayed, respectively.

When the button pushed at the initial selecting stage 24a is "dt" in FIG. 5, the screen (D3) in FIG. 10 is displayed on the displaying part 12. According to the screen (D3) in FIG. 10, in the positions where 1, 2, 3, 4, 5, 6, 7, and 8 are displayed in FIG. 4, "d?," "d*," "di*," "du*," "t?," "t*," "ti*," and "tu*" are displayed, respectively.

When the button pushed at the initial selecting stage 24a is "nl" in FIG. 5, the screen (D4) in FIG. 10 is displayed on the displaying part 12. According to the screen (D4) in FIG. 10, in the positions where 1, 2, 3, 4, 5, 6, 7, and 8 are displayed in FIG. 4, "n?," "n*," "ni*," "nu/v*," "l?," "l*," "li*," and "lu/v*" are displayed, respectively.

When the button pushed at the initial selecting stage 24a is "gkh" in FIG. 5, the screen (D5) in FIG. 10 is displayed on the displaying part 12. According to the screen (D5) in FIG. 10, in the positions where 1, 2, 3, 4, 5, 6, 7, 8, and 9 are displayed in FIG. 4, "g?," "g*," "gu*," "k?," "k*," "ku*," "h?," "h*," and "hu*" are displayed, respectively.

When the button pushed at the initial selecting stage 24a is "jzhz" in FIG. 5, the screen (D6) in FIG. 10 is displayed on the displaying part 12. According to the screen (D6) in FIG. 10, in the positions where 1, 2, 3, 4, 5, 6, 7, 8, and 9 are displayed in FIG. 4, "j?," "ji*," "ju*," "zh?," "zh*," "zhu*," "z?," "z*," and "zu*" are displayed, respectively.

When the button pushed at the initial selecting stage 24a is "qchc" in FIG. 5, the screen (D7) in FIG. 10 is displayed on the displaying part 12. According to the screen (D7) in FIG. 10, in the positions where 1, 2, 3, 4, 5, 6, 7, 8, and 9 are displayed in FIG. 4, "q?," "qi*," "qu*," "ch?," "ch*," "chu*," "c?," and "cu*" are displayed, respectively.

When the button pushed at the initial selecting stage 24a is "xshs" in FIG. 5, the screen (D8) in FIG. 10 is displayed on the displaying part 12. According to the screen (D8) in FIG. 10, in the positions where 1, 2, 3, 4, 5, 6, 7, 8, and 9 are displayed in FIG. 4, "x?," "xi*," "xu*," "sh?," "sh*," "shu*," "s?," "s*," and "su*" are displayed, respectively.

When the button pushed at the initial selecting stage 24a is "ryw" in FIG. 5, the screen (D9) in FIG. 10 is displayed on the displaying part 12. According to the screen (D9) in FIG. 10, in the positions where 1, 2, 3, 4, 5, 6, 7, and 8 are displayed in FIG. 4, "r?," "r*," "ru*," "?," "*," "y*," "w*," and "yu*" are displayed, respectively.

The second touch of a key selects one of the records of the initial-final table (D1–D9). That is, an initial is specified and a final group is selected with the second touch of a key. Note that a record of an initial-final table (D1–D9) being selected corresponds to an initial-final group being specified. After the second touch of a key, the processing proceeds to the final selecting stage 24c, where one of the syllable tables D11–D99 is referred.

FIG. 11 is a schematic diagram showing the syllable tables D11–D99, each having a plurality of records. Each record in the syllable table (D11–D99) has "button," "final," and "syllable" fields.

In the "button" fields, numerals corresponding to the buttons "1," "2," "3," . . . displayed in FIG. 4, are stored, respectively. In the "final" field, a string of letters representing a final is stored. In the "syllable" field, a string of letters representing a syllable, composed of the initial specified at the initial-final selecting stage 24b and the final stored in the "final" field, is stored.

FIGS. 12–20 are schematic views, each showing the second displaying part 12 at the step of selecting a final. After a touch of a button of D1–D9 in FIG. 10 completes the initial-final selecting stage 24b, one of screens in FIGS. 12–20 is displayed on the displaying part 12. The screens in FIGS. 12–20 correspond to the syllable specifying information.

More specifically, when the button pushed at the initial-final selecting stage 24b is "b?" in FIG. 10 (D1), alternatives of syllables, "ba," "bo," "bi," and "bu," are displayed on the displaying part 12 as shown in FIG. 12 (D11).

When the button "b*" in FIG. 10 (D1) is pushed, alternatives of syllables, "bai," "bei," "bao," "ban," "ben," "band," and "beng," are displayed on the displaying part 12 as shown in FIG. 12 (D12).

When the button "bi*" in FIG. 10 (D1) is pushed, alternatives of syllables, "bie," "biao," "bian," "bin," "bing," are displayed on the displaying part 12 as shown in FIG. 12 (D13).

When the button "p?" in FIG. 10 (D1) is pushed, alternatives of syllables, "pa," "po," "pi," and "pu," are displayed on the displaying part 12 as shown in FIG. 12 (D14).

When the button "p*" in FIG. 10 (D1) is pushed, alternatives of syllables, "pai," "pei," "pao," "pou," "pan," "pen," "pang," and "peng," are displayed on the displaying part 12 as shown in FIG. 12 (D15).

When the button "pi*" in FIG. 10 (D1) is pushed, alternatives of syllables, "pie," "piao," "pian," "pin," and "ping," are displayed on the displaying part 12 as shown in FIG. 12 (D16).

On the other hand, when the button "m?" in FIG. 10 (D2) is pushed, alternatives of syllables, "ma," "mo," "me," "mi," and "mu," are displayed on the displaying part 12, and a special syllable "m" is also displayed thereon, as shown in FIG. 13 (D21).

When the button "m*" in FIG. 10 (D2) is pushed, alternatives of syllables, "mai," "mei," "mao," "mou," "man," "men," "mang," and "meng," are displayed on the displaying part 12 as shown in FIG. 13 (D22).

When the button "mi*" in FIG. 10 (D2) is pushed, alternatives of syllables, "mie," "miao," "miu," "mian," "min," and "ming," are displayed on the displaying part 12 as shown in FIG. 13 (D23).

When the button "f?" in FIG. 10 (D2) is pushed, alternatives of syllables, "fa," "fo," and "fu," are displayed on the displaying part 12 as shown in FIG. 13 (D24).

When the button "f*" in FIG. 10 (D2) is pushed, alternatives of syllables, "fei," "fou," "fan," "fen," "fang," and "feng," are displayed on the displaying part 12 as shown in FIG. 13 (D25).

On the other hand, when the button "d?" in FIG. 10 (D3) is pushed, alternatives of syllables, "da," "de," "di," and "du," are displayed on the displaying part 12 as shown in FIG. 14 (D31).

When the button "d*" in FIG. 10 (D3) is pushed, alternatives of syllables, "dai," "dei," "dao," "dou," "dan," "dang," "deng," and "dong," are displayed on the displaying part 12 as shown in FIG. 14 (D32).

When the button "di*" in FIG. 10 (D3) is pushed, alternatives of syllables, "dia," "die," "diao," "diu," "dian," and "ding," are displayed on the displaying part 12 as shown in FIG. 14 (D33).

When the button "du*" in FIG. 10 (D3) is pushed, alternatives of syllables, "duo," "dui," "duan," and "dun," are displayed on the displaying part 12 as shown in FIG. 14 (D34). Note that in FIG. 14 (D34) parenthesized "dong" is displayed. The parenthesized "dong" is unnecessary, if only Pinyin is adopted. However, instead of the parenthesized "dong," "dong" without parenthesis should be displayed, if Bopomofo is adopted.

When the button "t?" in FIG. 10 (D3) is pushed, alternatives of syllables, "ta," "te," "ti," and "tu," are displayed on the displaying part 12 as shown in FIG. 14 (D35).

When the button "t*" in FIG. 10 (D3) is pushed, alternatives of syllables, "tai," "tei," "tao," "tou," "tan," "tang," "teng," and "tong," are displayed on the displaying part 12 as shown in FIG. 14 (D36).

When the button "ti*" in FIG. 10 (D3) is pushed, alternatives of syllables, "tie," "tiao," "tian," and "ting," are displayed on the displaying part 12 as shown in FIG. 14 (D37).

When the button "tu*" in FIG. 10 (D3) is pushed, alternatives of syllables, "tuo," "tui," "tuan," and "tun," are displayed on the displaying part 12 as shown in FIG. 14 (D38). Note that in FIG. 14 (D38) parenthesized "tong" is displayed. The parenthesized "tong" is unnecessary, if only Pinyin is adopted. However, instead of the parenthesized "tong," "tong" without parenthesis should be displayed, if Bopomofo is adopted.

On the other hand, when the button "n?" in FIG. 10 (D4) is pushed, alternatives of syllables, "na," "ne," "ni," "nu," and "nv," are displayed on the displaying part 12, and a special syllable "n" is also displayed thereon, as shown in FIG. 15 (D41).

When the button "n*" in FIG. 10 (D4) is pushed, alternatives of syllables, "nai," "nei," "nao," "nou," "nan," "nen," "nang," "neng," and "nong," are displayed on the displaying part 12 as shown in FIG. 15 (D42).

When the button "ni*" in FIG. 10 (D4) is pushed, alternatives of syllables, "nie," "niao," "niu," "nian," "nin," "niang," and "ning," are displayed on the displaying part 12 as shown in FIG. 15 (D43).

When the button "nu/v*," equivalent to nu*/nv*, in FIG. 10 (D4) is pushed, alternatives of syllables, "nuo," "nve," and "nuan," are displayed on the displaying part 12 as shown in FIG. 15 (D44). Note that in FIG. 15 (D44) parenthesized "nong" is displayed. The parenthesized "nong" is unnecessary, if only Pinyin is adopted. However, instead of the parenthesized "nong," "nong" without parenthesis should be displayed, if Bopomofo is adopted.

When the button "l?" in FIG. 10 (D4) is pushed, alternatives of syllables, "la," "lo," "le," "li," "lu," and "lv," are displayed on the displaying part 12 as shown in FIG. 15 (D45).

When the button "l*" in FIG. 10 (D4) is pushed, alternatives of syllables, "lai," "lei," "lao," "lou," "lan," "lang," "leng," and "long," are displayed on the displaying part 12 as shown in FIG. 15 (D46).

When the button "li*" in FIG. 10 (D4) is pushed, alternatives of syllables, "lia," "lie," "liao," "liu," "lian," "lin," "liang," and "ling," are displayed on the displaying part 12 as shown in FIG. 15 (D47).

When the button "lu/v*," equivalent to lu*/lv*, in FIG. 10 (D4) is pushed, alternatives of syllables, "luo," "lve," "luan," and "lun," are displayed on the displaying part 12 as shown in FIG. 15 (D48). Note that in FIG. 15 (D48) parenthesized "long" is displayed. The parenthesized "long" is unnecessary, if only Pinyin is adopted. However, instead of the parenthesized "long," "long" without parenthesis should be displayed, if Bopomofo is adopted.

On the other hand, when the button "g?" in FIG. 10 (D5) is pushed, alternatives of syllables, "ga," "ge," and "gu," are displayed on the displaying part 12 as shown in FIG. 16 (D51).

When the button "g*" in FIG. 10 (D5) is pushed, alternatives of syllables, "gai," "gei," "gao," "gou," "gan," "gen," "gang," "geng," and "gong," are displayed on the displaying part 12 as shown in FIG. 16 (D52).

When the button "gu*" in FIG. 10 (D5) is pushed, alternatives of syllables, "gua," "guo," "guai," "gui," "guan," "gun," and "guang," are displayed on the displaying part 12 as shown in FIG. 16 (D53). Note that in FIG. 16 (D53) parenthesized "gong" is displayed. The parenthesized "gong" is unnecessary, if only Pinyin is adopted. However, instead of the parenthesized "gong," "gong" without parenthesis should be displayed, if Bopomofo is adopted.

When the button "k?" in FIG. 10 (D5) is pushed, alternatives of syllables, "ka," "ke," and "ku," are displayed on the displaying part 12 as shown in FIG. 16 (D54).

When the button "k*" in FIG. 10 (D5) is pushed, alternatives of syllables, "kai," "kei," "kao," "kou," "kan," "ken," "kang," "keng," and "kong," are displayed on the displaying part 12 as shown in FIG. 16 (D55).

When the button "ku*" in FIG. 10 (D5) is pushed, alternatives of syllables, "kua," "kuo," "kuai," "kui," "kuan," "kun," and "kuang," are displayed on the displaying part 12 as shown in FIG. 16 (D56). Note that in FIG. 16 (D56) parenthesized "kong" is displayed. The parenthesized "kong" is unnecessary, if only Pinyin is adopted. However, instead of the parenthesized "kong," "kong" without parenthesis should be displayed, if Bopomofo is adopted.

When the button "h?" in FIG. 10 (D5) is pushed, alternatives of syllables, "ha," "he," and "hu," are displayed on the displaying part 12 as shown in FIG. 16 (D57).

When the button "h*" in FIG. 10 (D5) is pushed, alternatives of syllables, "hai," "hei," "hao," "hou," "han," "hen," "hang," "heng," and "hong," are displayed on the displaying part 12, and a special syllable "hng" is also displayed thereon, as shown in FIG. 16 (D58).

When the button "hu*" in FIG. 10 (D5) is pushed, alternatives of syllables, "hua," "huo," "huai," "hui," "huan," "hun," and "huang," are displayed on the displaying part 12 as shown in FIG. 16 (D59). Note that in FIG. 16 (D59) parenthesized "hong" is displayed. The parenthesized "hong" is unnecessary, if only Pinyin is adopted. However, instead of the parenthesized "hong," "hong" without parenthesis should be displayed, if Bopomofo is adopted.

On the other hand, when the button "j?" in FIG. 10 (D6) is pushed, alternatives of syllables, "ji," and "ju," are displayed on the displaying part 12 as shown in FIG. 17 (D61). Note that in FIG. 17 (D61) parenthesized "jia" and "ju" are displayed. The parenthesized "jia" and "ju" are unnecessary, if only Pinyin is adopted. However, instead of the parenthesized "jia" and "ju," "jia" and "ju" without parenthesis should be displayed, if Bopomofo is adopted.

When the button "ji*" in FIG. 10 (D6) is pushed, alternatives of syllables, "jia," "jie," "jiao," "jiu," "jian," "jin," "jiang," "jing," and "jiong," are displayed on the displaying part 12 as shown in FIG. 17 (D62).

When the button "ju*" in FIG. 10 (D6) is pushed, alternatives of syllables, "jue," "juan," and "jun," are displayed on the displaying part 12 as shown in FIG. 17 (D63). Note that in FIG. 17 (D63) parenthesized "jiong" is displayed. The parenthesized "jiong" is unnecessary, if only Pinyin is adopted. However, instead of the parenthesized "jiong," "jiong" without parenthesis should be displayed, if Bopomofo is adopted.

When the button "zh?" in FIG. 10 (D6) is pushed, alternatives of syllables, "zha," "zhe," "zhi," and "zhu," are displayed on the displaying part 12 as shown in FIG. 17 (D64). Note that in FIG. 17 (D64) parenthesized "zhi" is displayed. The parenthesized "zhi" is unnecessary, if only Pinyin is adopted. However, instead of the parenthesized "zhi," "zhi" without parenthesis should be displayed, if Bopomofo is adopted.

When the button "zh*" in FIG. 10 (D6) is pushed, alternatives of syllables, "zhai," "zhei," "zhao," "zhou," "zhan," "zhen," "zhang," "zheng," and "zhong," are displayed on the displaying part 12 as shown in FIG. 17 (D65).

When the button "zhu*" in FIG. 10 (D6) is pushed, alternatives of syllables, "zhua," "zhuo," "zhuai," "zhui," "zhuan," "zhun," and "zhuang," are displayed on the displaying part 12 as shown in FIG. 17 (D66). Note that in FIG. 17 (D66) parenthesized "zhong" is displayed. The parenthesized "zhong" is unnecessary, if only Pinyin is adopted. However, instead of the parenthesized "zhong," "zhong" without parenthesis should be displayed, if Bopomofo is adopted.

When the button "z?" in FIG. 10 (D6) is pushed, alternatives of syllables, "za," "ze," "zi," and "zu," are displayed on the displaying part 12 as shown in FIG. 17 (D67). Note that in FIG. 17 (D67) parenthesized "zi" is displayed. The parenthesized "zi" is unnecessary, if only Pinyin is adopted. However, instead of the parenthesized "zi," "zi" without parenthesis should be displayed, if Bopomofo is adopted.

When the button "z*" in FIG. 10 (D6) is pushed, alternatives of syllables, "zai," "zei," "zao," "zou," "zan," "zen," "zang," "zeng," and "zong," are displayed on the displaying part 12 as shown in FIG. 17 (D68).

When the button "zu*" in FIG. 10 (D6) is pushed, alternatives of syllables, "zuo," "zui," "zuan," and "zun," are displayed on the displaying part 12 as shown in FIG. 17 (D69). Note that in FIG. 17 (D69) parenthesized "zong" is displayed. The parenthesized "zong" is unnecessary, if only Pinyin is adopted. However, instead of the parenthesized "zong," "zong" without parenthesis should be displayed, if Bopomofo is adopted.

On the other hand, when the button "q?" in FIG. 10 (D7) is pushed, alternatives of syllables, "qi," and "qu," are displayed on the displaying part 12 as shown in FIG. 18 (D71). Note that in FIG. 18 (D71) parenthesized "qia" and "qu" are displayed. The parenthesized "qia" and "qu" are unnecessary, if only Pinyin is adopted. However, instead of the parenthesized "qia" and "qu," "qia" and "qu" without parenthesis should be displayed, if Bopomofo is adopted.

When the button "qi*" in FIG. 10 (D7) is pushed, alternatives of syllables, "qia," "qie," "qiao," "qiu," "qian," "qin," "qiang," "qing," and "qiong," are displayed on the displaying part 12 as shown in FIG. 18 (D72).

When the button "qu*" in FIG. 10 (D7) is pushed, alternatives of syllables, "que," "quan," and "qun," are displayed on the displaying part 12 as shown in FIG. 18 (D73). Note that in FIG. 18 (D73) parenthesized "qiong" is displayed. The parenthesized "qiong" is unnecessary, if only Pinyin is adopted. However, instead of the parenthesized "qiong," "qiong" without parenthesis should be displayed, if Bopomofo is adopted.

When the button "ch?" in FIG. 10 (D7) is pushed, alternatives of syllables, "cha," "che," "chi," and "chu," are displayed on the displaying part 12 as shown in FIG. 18 (D74). Note that in FIG. 18 (D74) parenthesized "chu" is displayed. The parenthesized "chu" is unnecessary, if only Pinyin is adopted. However, instead of the parenthesized "chu," "chu" without parenthesis should be displayed, if Bopomofo is adopted.

When the button "ch*" in FIG. 10 (D7) is pushed, alternatives of syllables, "chai," "chao," "chou," "chan," "chen," "chang," "cheng," and "chong," are displayed on the displaying part 12 as shown in FIG. 18 (D75).

When the button "chu*" in FIG. 10 (D7) is pushed, alternatives of syllables, "chuo," "chuai," "chui," "chuan," "chun," and "chuang," are displayed on the displaying part 12 as shown in FIG. 18 (D76). Note that in FIG. 18 (D76) parenthesized "chong" is displayed. The parenthesized "chong" is unnecessary, if only Pinyin is adopted. However, instead of the parenthesized "chong," "chong" without parenthesis should be displayed, if Bopomofo is adopted.

When the button "c?" in FIG. 10 (D7) is pushed, alternatives of syllables, "ca," "ce," "ci," and "cu," are displayed on the displaying part 12 as shown in FIG. 18 (D77). Note that in FIG. 18 (D77) parenthesized "cu" is displayed. The parenthesized "cu" is unnecessary, if only Pinyin is adopted. However, instead of the parenthesized "cu," "cu" without parenthesis should be displayed, if Bopomofo is adopted.

When the button "c*" in FIG. 10 (D7) is pushed, alternatives of syllables, "cai," "cao," "cou," "can," "cen," "cang," "ceng," and "cong," are displayed on the displaying part 12 as shown in FIG. 18 (D78).

When the button "cu*" in FIG. 10 (D7) is pushed, alternatives of syllables, "cuo," "cui," "cuan," and "cun," are displayed on the displaying part 12 as shown in FIG. 18 (D79). Note that in FIG. 18 (D79) parenthesized "cong" is displayed. The parenthesized "cong" is unnecessary, if only Pinyin is adopted. However, instead of the parenthesized "cong," "cong" without parenthesis should be displayed, if Bopomofo is adopted.

On the other hand, when the button "x?" in FIG. 10 (D8) is pushed, alternatives of syllables, "xi," and "xu," are displayed on the displaying part 12 as shown in FIG. 19 (D81). Note that in FIG. 19 (D81) parenthesized "xia" and "xu" are displayed. The parenthesized "xia" and "xu" are unnecessary, if only Pinyin is adopted. However, instead of the parenthesized "xia" and "xu," "xia" and "xu" without parenthesis should be displayed, if Bopomofo is adopted.

When the button "xi*" in FIG. 10 (D8) is pushed, alternatives of syllables, "xia," "xie," "xiao," "xiu," "xian," "xin," "xiang," "xing," and "xiong," are displayed on the displaying part 12 as shown in FIG. 19 (D82).

When the button "xu*" in FIG. 10 (D8) is pushed, alternatives of syllables, "xue," "xuan," and "xun," are displayed on the displaying part 12 as shown in FIG. 19 (D83). Note that in FIG. 19 (D83) parenthesized "xiong" is displayed. The parenthesized "xiong" is unnecessary, if only Pinyin is adopted. However, instead of the parenthesized "xiong," "xiong" without parenthesis should be displayed, if Bopomofo is adopted.

When the button "sh?" in FIG. 10 (D8) is pushed, alternatives of syllables, "sha," "she," "shi," and "shu," are displayed on the displaying part 12 as shown in FIG. 19 (D84). Note that in FIG. 19 (D84) parenthesized "shi" is displayed. The parenthesized "shi" is unnecessary, if only Pinyin is adopted. However, instead of the parenthesized "shi," "shi" without parenthesis should be displayed, if Bopomofo is adopted.

When the button "sh*" in FIG. 10 (D8) is pushed, alternatives of syllables, "shai," "shei," "shao," "shou," "shan," "shen," "shang," and "sheng," are displayed on the displaying part 12 as shown in FIG. 19 (D85).

When the button "shu*" in FIG. 10 (D8) is pushed, alternatives of syllables, "shua," "shuo," "shuai," "shui," "shuan," "shun," and "shuang," are displayed on the displaying part 12 as shown in FIG. 19 (D86).

When the button "s?" in FIG. 10 (D8) is pushed, alternatives of syllables, "sa," "se," "si," and "su," are displayed on the displaying part 12 as shown in FIG. 19 (D87). Note that in FIG. 19 (D87) parenthesized "si" is displayed. The parenthesized "si" is unnecessary, if only Pinyin is adopted. However, instead of the parenthesized "si," "si" without parenthesis should be displayed, if Bopomofo is adopted.

When the button "s*" in FIG. 10 (D8) is pushed, alternatives of syllables, "sai," "sao," "sou," "san," "sen," "sang," "seng," and "song," are displayed on the displaying part 12 as shown in FIG. 19 (D88).

When the button "su*" in FIG. 10 (D8) is pushed, alternatives of syllables, "suo," "sui," "suan," and "sun," are displayed on the displaying part 12 as shown in FIG. 19 (D89). Note that in FIG. 19 (D89) parenthesized "song" is displayed. The parenthesized "song" is unnecessary, if only Pinyin is adopted. However, instead of the parenthesized "song," "song" without parenthesis should be displayed, if Bopomofo is adopted.

On the other hand, when the button "r?" in FIG. 10 (D9) is pushed, alternatives of syllables, "re," "ri," and "ru," are displayed on the displaying part 12 as shown in FIG. 20 (D91). Note that in FIG. 20 (D91) parenthesized "ri" is displayed. The parenthesized "ri" is unnecessary, if only Pinyin is adopted. However, instead of the parenthesized "ri," "ri" without parenthesis should be displayed, if Bopomofo is adopted.

When the button "r*" in FIG. 10 (D9) is pushed, alternatives of syllables, "rao," "rou," "ran," "ren," "rang," "reng," and "rong," are displayed on the displaying part 12 as shown in FIG. 20 (D92).

When the button "ru*" in FIG. 10 (D9) is pushed, alternatives of syllables, "ruo," "rui," "ruan," and "run," are displayed on the displaying part 12 as shown in FIG. 20 (D93). Note that in FIG. 20 (D93) parenthesized "rong" is displayed. The parenthesized "rong" is unnecessary, if only Pinyin is adopted. However, instead of the parenthesized "rong," "rong" without parenthesis should be displayed, if Bopomofo is adopted.

When the button "?" in FIG. 10 (D9) is pushed, alternatives of syllables, "a," "o," "e," "yi," "wu," "yu," "^e," and "er," are displayed on the displaying part 12 as shown in FIG. 20 (D94).

When the button "*" in FIG. 10 (D9) is pushed, alternatives of syllables, "ai," "ei," "ao," "ou," "an," "en," "ang," "eng," and "ong," are displayed on the displaying part 12, and a special syllable "ng" is also displayed thereon, as shown in FIG. 20 (D95).

When the button "y*" in FIG. 10 (D9) is pushed, alternatives of syllables, "ya," "ye," "yao," "you," "yan," "yin," "yang," "ying," and "yong," are displayed on the displaying part 12, and a special syllable "yo" is also displayed thereon, as shown in FIG. 20 (D96).

When the button "w*" in FIG. 10 (D9) is pushed, alternatives of syllables, "wa," "wo," "wai," "wei," "wan," "wen," "wang," and "weng," are displayed on the displaying part 12 as shown in FIG. 20 (D97).

When the button "yu*" in FIG. 10 (D9) is pushed, alternatives of syllables, "yue," "yuan," and "yun," are displayed on the displaying part 12 as shown in FIG. 20 (D98). Note that in FIG. 20 (D98) parenthesized "yong" is displayed. The parenthesized "yong" is unnecessary, if only Pinyin is adopted. However, instead of the parenthesized "yong," "yong" without parenthesis should be displayed, if Bopomofo is adopted.

As described above, an initial group is specified at the initial selecting stage 24*a*, an initial is determined and a final group is also specified at the initial-final selecting stage 24*b*, and a syllable is determined at the final selecting stage 24*c*.

Note that elements each stored in the "syllable" field in the syllable tables D11–D99 in FIG. 11, are displayed in FIGS. 12–20. Instead of that, elements each stored in the "final" field may be displayed.

Besides the standard syllables shown in FIG. 6, the special syllables are included in FIGS. 12–20. FIG. 21 is a schematic diagram showing procedures for inputting the special syllables. As shown in FIG. 21, the special syllable "m" is input by "mf" in FIG. 5 being selected at the initial selecting stage, "m?" in FIG. 10 (D2) being selected at the initial-final selecting stage, and "m" in FIG. 13 (D21) being selected. Note that the place where "m" is displayed in FIG. 13 (D21) corresponds to that where "0" is displayed in FIG. 4. More specifically, the place where "0" is displayed in FIG. 4 has connotations of exceptions, and used for input of the special syllables.

The special syllable "n" is input by "nl" in FIG. 5 being selected at the initial selecting stage, "n?" in FIG. 10 (D4) being selected at the initial-final selecting stage, and "n" in FIG. 15 (D41) being selected at the final selecting stage.

The special syllable "hng" is input by "gkh" in FIG. 5 being selected at the initial selecting stage, "h*" in FIG. 10 (D5) being selected at the initial-final selecting stage, and "hng" in FIG. 16 (D58) being selected at the final selecting stage.

The special syllable "ng" is input by "ryw" in FIG. 5 being selected at the initial selecting stage, "*" in FIG. 10 (D9) being selected at the initial-final selecting stage, and "ng" in FIG. 20 (D95) being selected at the final selecting stage.

The special syllable "yo" is input by "ryw" in FIG. 5 being selected at the initial selecting stage, "y*" in FIG. 10 (D9) being selected at the initial-final selecting stage, and "yo" in FIG. 20 (D96) being selected at the final selecting stage.

Figure 22:
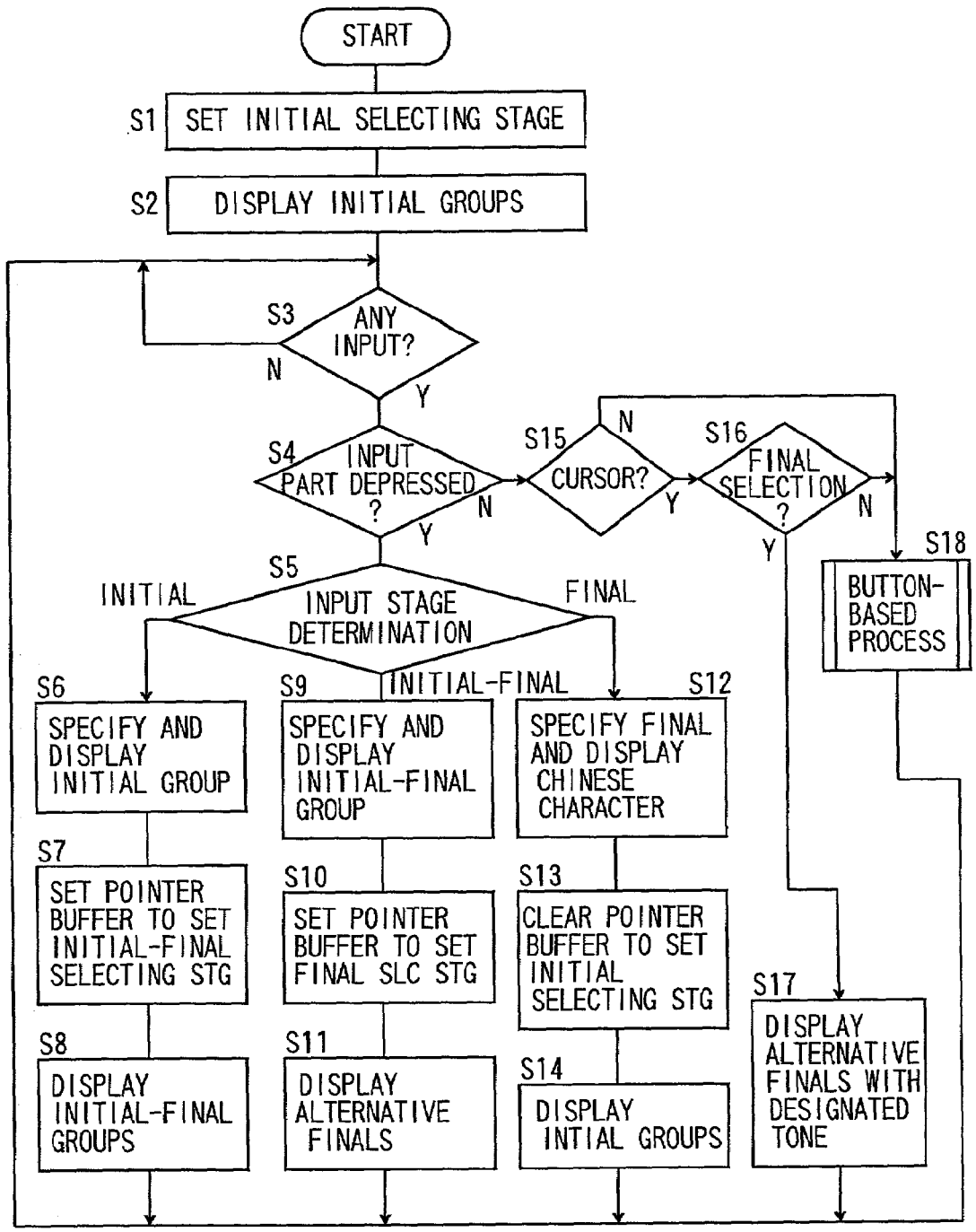
FIG. 22 is a flowchart shows the processing according to the embodiment of the present invention.

With reference to the flowchart in FIG. 22, the process of the input module 24 of the Chinese language input program 23, is further described as follows. The flowchart is initiated when the user pushes the mode button 15 to set the Chinese input mode, and terminated when the user sets another input mode.

It should be noted that the controller 20 refers to the pointer buffer 22 to recognize the present stage, which is the initial selecting stage, the initial-final selecting stage, or the final selecting stage. More specifically, the stage is the initial selecting stage when the pointer buffer 22 is NULL. The stage is the initial-final selecting stage when one of D1–D9 is stored in the pointer buffer 22. The stage is the final selecting stage when one of D11–D99 is stored in the pointer buffer 22.

At step S1 the controller 20 clear the pointer buffer 22 NULL to set the initial selecting stage.

At step S2 the controller 20 refers to the initial table D in FIG. 8 to display the alternatives of initial groups on the displaying part 12. The screen shown in FIG. 5 is displayed thereon.

At step S3 the controller 20 monitors input by the user. When input is detected, the processing advances to step S4.

At step S4 the controller 20 distinguishes whether the input by the user was the input part 13 being pushed or another types of input. Note that another types of input includes input by operation of the cursor 14, a back space key, or keys used for the conversion module 25. When it is distinguished that the input part 13 was pushed, the processing advances to step S5. In other cases, the processing advances to step S15.

At step S5 the controller 20 refers to the pointer buffer 22 to distinguish which the present stage is the initial selecting stage, the initial-final selecting stage, or the final selecting stage. When the step is the initial selecting stage, the processing advances to S6. When the stage is the initial-final selecting stage, the processing advances to S9. When the stage is the final selecting stage, the processing advances to step S12.

At step S6 the controller 20 specifies which one of the buttons shown in FIG. 5 is touched, based on the place on the input part 13 touched by the user. That is, the controller 20 specifies which one of the records in the initial table D in FIG. 8 is selected by the user. Then the controller 20 displays the initial group stored in the "alternative" field in the specified record on the first displaying part 11. For example, when the record whose "alternative" is "bp" is specified, "bp" is displayed on the displaying part 11.

At step S7 the controller 20 writes to the pointer buffer 22 to set the input stage as the initial-final selecting stage. More specifically, the controller 20 obtains the value stored in the "pointer" field in the record specified at S6, and writes the obtained value to the pointer buffer 22. For example, when the record whose "alternative" is "bp" is specified, "D1" is stored in the pointer buffer 22.

At step S8 the controller 20 refers one of the initial-final tables D1–D9 in FIG. 9 corresponding to the value stored in the pointer buffer 22 to display alternatives of the initial-final groups on the second displaying part 12. One of the screens (D1)–(D9) in FIG. 10 is displayed on the displaying part 12. For example, when "D1" is stored in the pointer buffer 22, the screen (D1) in FIG. 10 is displayed. The processing returns to S3.

At step S9, because the stage has been specified as the initial-final selecting stage, the controller 20 specifies which one of the buttons displayed in FIG. 10 is touched based on the place on the input part 13 touched by the user. That is, the controller 20 specifies which one of the records in the initial-final tables D1–D9 is selected by the user. Then, the controller 20 displays the initial-final group stored in the "alternative" field of the specified record on the first displaying part 11, instead of the initial group displayed thereon. For example, the record whose "alternative" is "b?" is specified, the initial-final group "b?" is displayed on the displaying part 11, instead of the initial group "bp" displayed thereon At step S10 the controller 20 writes to the pointer buffer 22 to set the input stage as the final selecting stage. More specifically, the controller 20 obtains the value stored in the "pointer" field in the record specified at S9 from the records in the initial-final tables D1–D9 in FIG. 9, and writes the obtained value to the pointer buffer 22. For example, when the record whose "alternative" is "b?" is specified, "D11" is stored in the pointer buffer 22.

At step S11 the controller 20 refers one of the syllable tables D11–D99 in FIG. 11 corresponding to the value stored in the pointer buffer 22 to display alternatives of the syllables on the second displaying part 12. One of the screens (D11)–(D99) in FIGS. 12–20 is displayed on the displaying part 12. For example, when "D11" is stored in the pointer buffer 22, the screen (D11) in FIG. 12 is displayed. The processing returns to S3.

At step S12, because the stage has been specified as the final selecting stage, the controller 20 specifies which one of the buttons displayed in FIGS. 12–20 is touched based on the place on the input part 13 touched by the user. That is, the controller 20 specifies which one of the records in the syllable tables D11–D99 in FIG. 11 is selected by the user. The "syllable" of the specified record is determined as the syllable input by the user.

Further, the controller 20 transmits the determined syllable to the conversion module 25, and obtains a Chinese character corresponding to the determined syllable from the conversion module 25. Note that when a plurality of characters for alternatives exists, the character registered as the first alternative, for example, is obtained. It should be also noted that the conversion module 25 may take into account of the syllable previously input to select a Chinese character. Then the controller 20 displays the Chinese character obtained from the conversion module 25 on the first displaying part 11, instead of the initial-final group displayed thereon.

At step S13 the controller 20 clear the pointer buffer 22 to set the input stage as the initial selecting stage. In other words, the pointer buffer 22 is set to be NULL for the next input of a syllable.

At step S14 the controller 20 refers the initial table D in FIG. 8 to display the alternatives of the initial groups on the second displaying part 12. On the displaying part 12 the screen shown in FIG. 5 is displayed. The processing returns to S3.

On the other hand, at step S15, because input made at S4 was not via input part 13, the controller 20 judges whether the input was made via cursor 14 or not. The processing advances to S16 in the case that the input was done via cursor 14, or alternatively advances to S18 in all other cases.

At step S16 the controller 20 judges whether the input stage is the final selecting stage or not. Note that when one of D11–D99 is stored in the pointer buffer 22, the input stage is final selecting stage. The processing advances to S17 in the case that the stage is the final selecting stage, or alternatively advances to S18 in all other cases.

At step S17 the controller 20 judges the tone based on the input via cursor 14 by the user, and displays a screen including denotation of the tone. The processing returns to S3. More specifically, the controller 20 judges that the first tone has been designated if the upward direction of the cursor 14 was input, the second tone has been designated if the right direction of the cursor 14 was input, the third tone has been designated if the downward direction of the cursor 14 was input, or the fourth tone has been designated if the left direction of the cursor 14 was input. Then the controller 20 assigns "1" if the first tone is designated, assigns "2" if the second tone is designated, assigns "3" if the third tone is designated, or assigns "4" if the fourth tone is designated, to display the screen including both the "syllable" of the syllable tables D11–D99 in FIG. 11 and one of "1"–"4" assigned corresponding to the tone which should follow to said "syllable" on the second displaying part 12.

Figure 23:
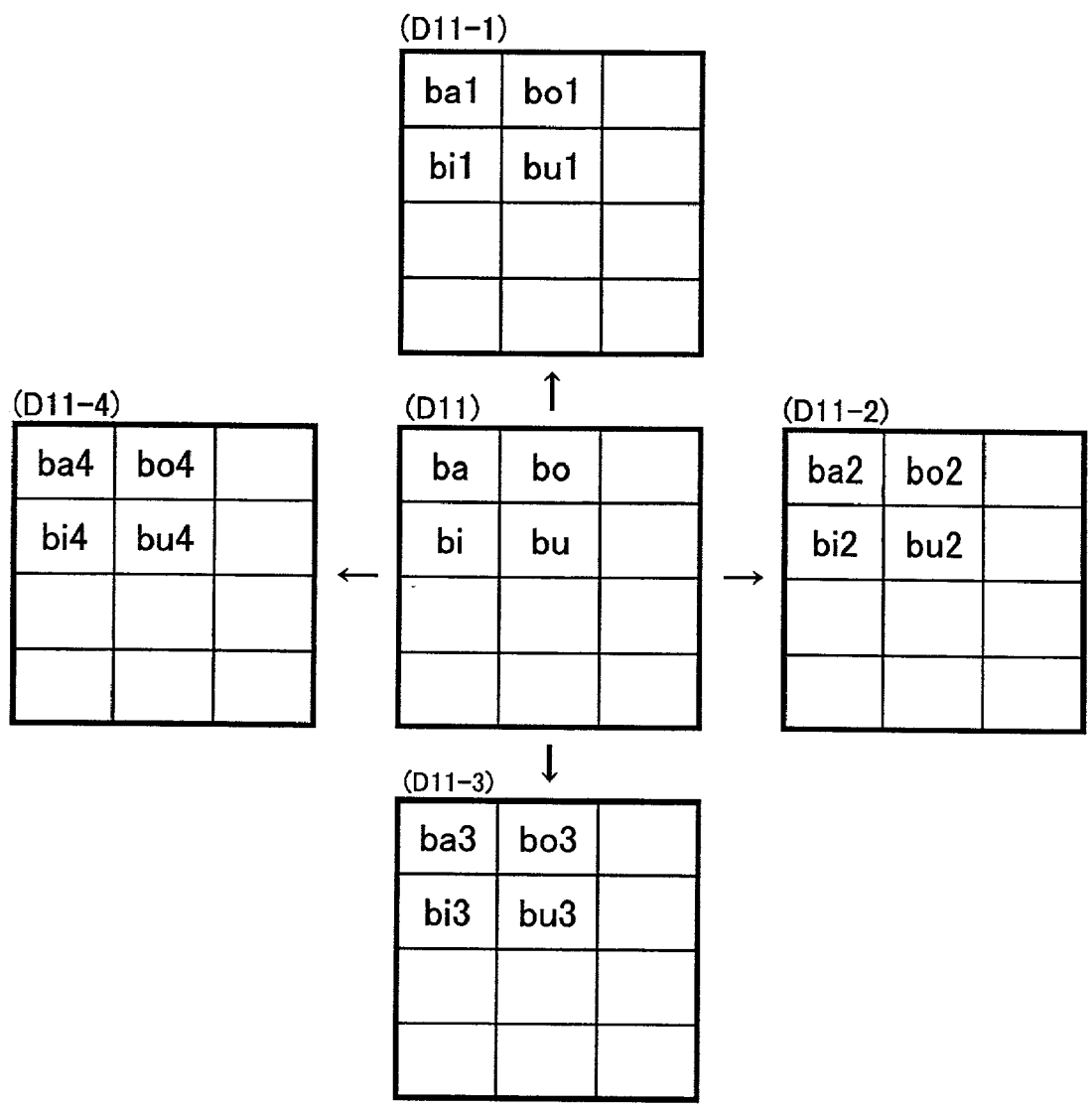
FIG. 23 is a schematic diagram illustrating selection of a tone.

For example, with D11 in the pointer buffer 22, if the first tone is selected, FIG. 23 (D11-1) is displayed, if the second tone is selected, FIG. 23 (D11-2) is displayed, if the third tone is selected, FIG. 23 (D11-3) is displayed, if the fourth tone is selected, FIG. 23 (D11-4) is displayed.

It should be noted that according to the description on S12, what is transmitted to the conversion module 25 is a "syllable." However, if the user designates the tone, what is transmitted to the conversion module 25 is a "syllable with a tone." In this case, the conversion module 25 selects a Chinese character taking the tone into account.

At step S18 the controller 20 executes a process corresponding to the operation by the user. For example, if the key used by the conversion module 25 was operated, the controller 20 executes the processing such as selecting or specifying a Chinese character, according to the function assigned to the key. Then the processing returns to S3.

As described above, according to the embodiment, each syllable is specified by three touches of keys. If the cursor 14 is operated after two touches of keys to the input part 13, i.e., the input part 13 or the cursor 14 are operated in four times in all, a syllable with a tone is specified.

Figure 24:
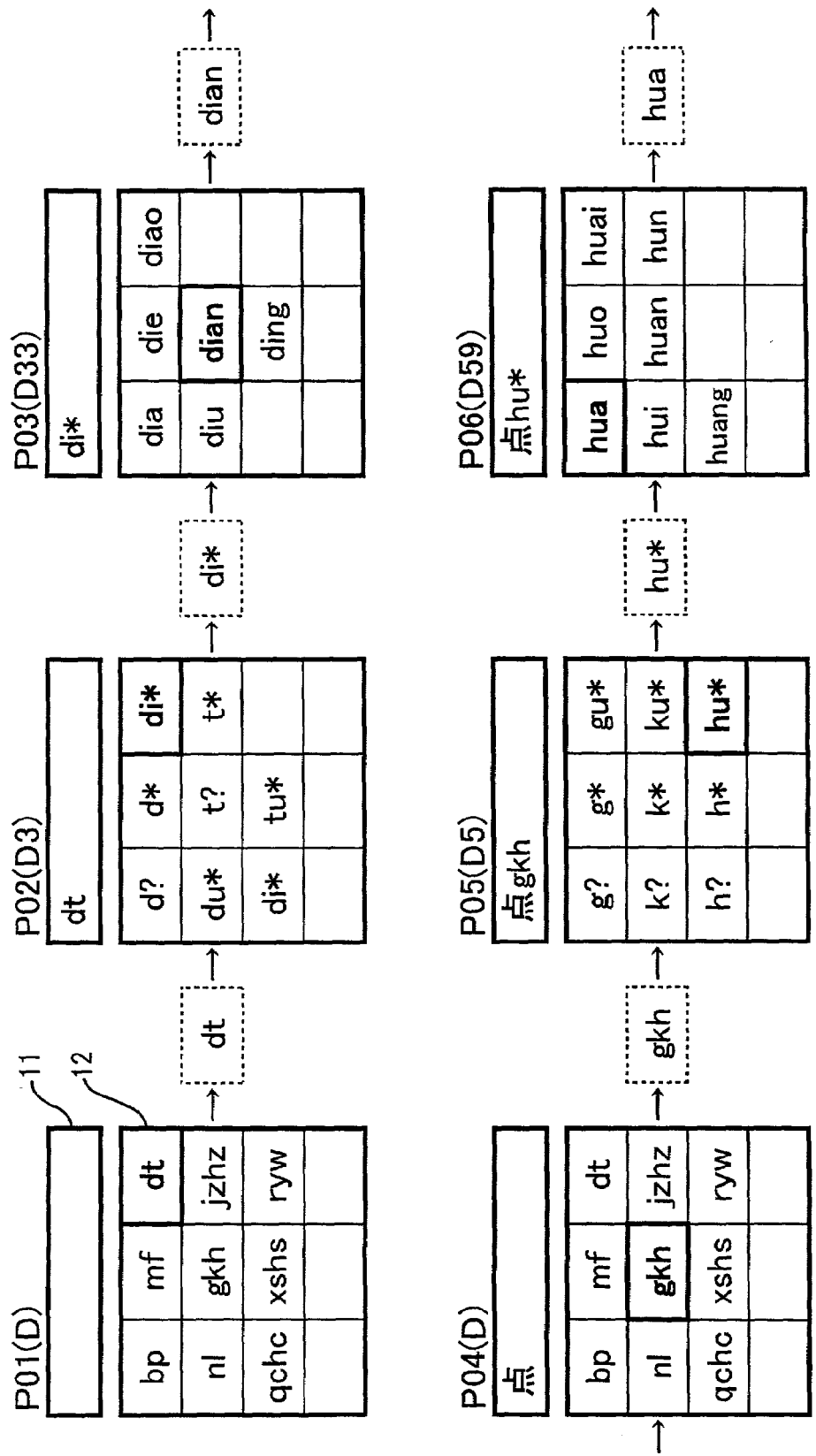
FIG. 24 is a diagram showing an example of input of the Chinese characters.
Figure 25:
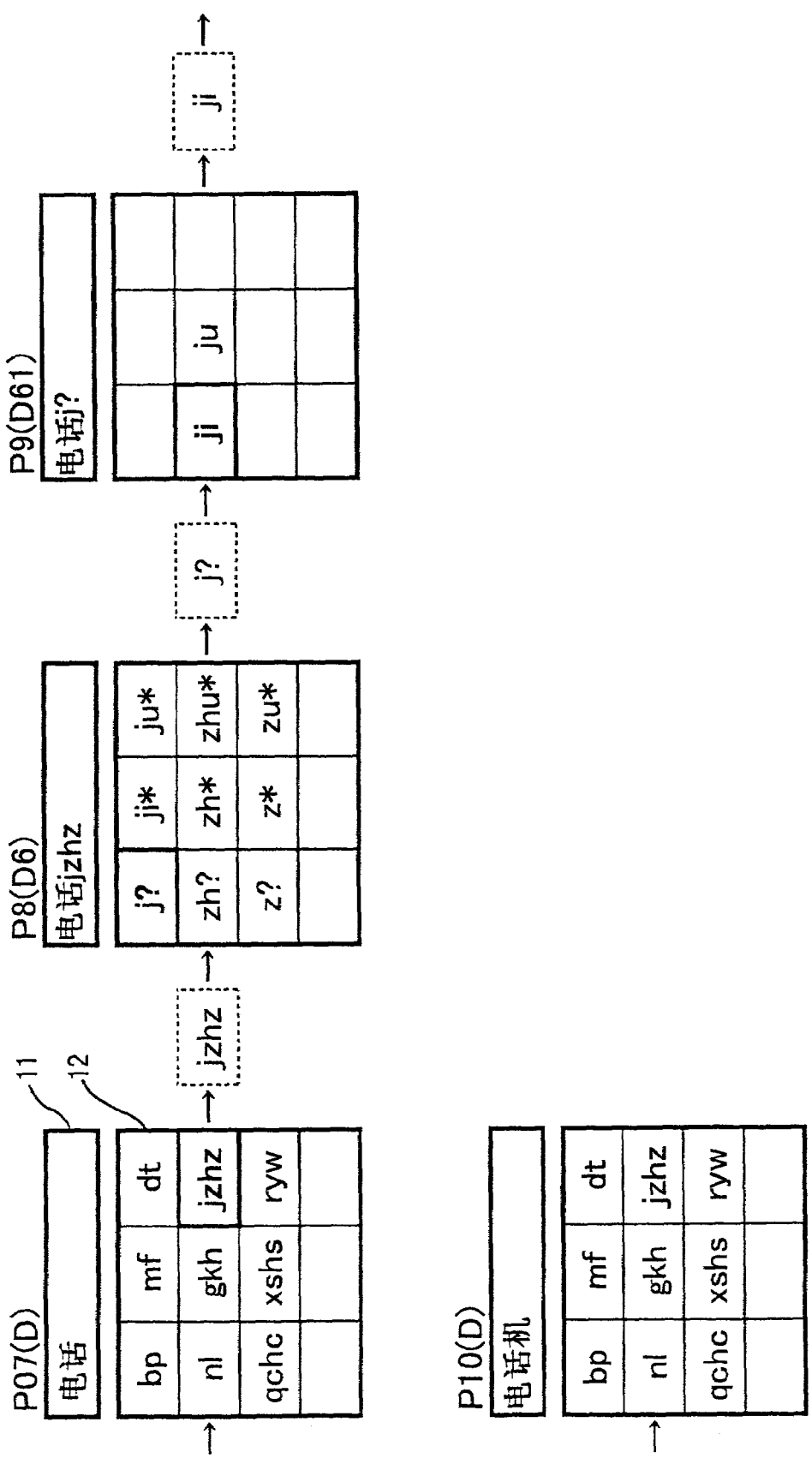
FIG. 25 is a diagram showing the example of input of the Chinese characters.

More specific description of input is described bellow with reference to the FIGS. 24 and 25. The example of the input is on "dianhuaji" in Pinyin corresponding to the string of Chinese characters which means a telephone set. Each of the display examples P01–P10 in FIGS. 24 and 25 schematically shows both the displaying parts 11 and 12.

The screen displayed first is shown in P01 in FIG. 24, according to which the alternatives of initial groups in the initial table D are displayed on the second displaying part 12. Note that nothing is displayed on the first displaying part 11. When the user pushes the button of "dt" to select the initial group "dt," the displaying parts 11 and 12 are switched to the state shown as P02.

In the state P02, "dt" is displayed on the first displaying part 11, and the alternatives of the initial-final groups in the initial-final table D3 are displayed on the second displaying part 12. When the user pushes the button of "di*" to select the initial-final gourp "di*," the displaying parts 11 and 12 are switched to the state shown as P3.

In the state P3, "di*" is displayed on the first displaying part 11, and the alternatives of the syllables in the syllable table D33 are displayed on the second displaying part 12. When the user pushes the button of "dian" to select the syllable "dian," the displaying parts 11 and 12 are switched to the state shown as P04.

In the state P04, the Chinese character corresponding to the syllable "dian" is displayed on the first displaying part 11. On the second displaying part 12, the alternatives of initial groups in the initial table D are displayed for the next input of a syllable. When the user pushes the button of "gkh" to select the initial group "gkh," the displaying parts 11 and 12 are switched to the state shown as P05.

In the state P05, both the Chinese character corresponding to the input syllable and the initial group "gkh" newly selected are displayed on the first displaying part 11. On the second displaying part 12, the alternatives are displayed of the initial-final groups in the initial-final table D5. When the user pushes the button of "hu*" to select the initial-final group "hu*," the displaying parts 11 and 12 are switched to the state shown as P6.

In the state P6, both the Chinese character corresponding to the input syllable and the initial-final group "hu*" newly selected are displayed on the first displaying part 11. On the second displaying part 12, the alternatives are displayed of syllables in the syllable table D59. When the user pushes the button of "hua" to select the syllable "hua," the displaying part 11 and 12 are switched to the state shown as P07 in FIG. 25.

In the state P07, the string of Chinese characters that means telephone is displayed on the first displaying part 11, because the conversion module 25 executed conversion again. The conversion was made based on both the syllable "dian" previously input and the syllable "hua" input after "dian," because the syllable "hua" was specified after the Chinese character corresponding to dian was displayed in the state P06. That is, the Chinese characters corresponding to "dianhua" are displayed on the first displaying part 11. On the second displaying part 12, the alternatives are displayed of initial groups in the initial table D. When the user pushes the button of "jzhz" to select the initial group "jzhz," the displaying parts 11 and 12 are switched to the state shown as P08.

In the state P08, both the Chinese characters corresponding to the input syllables and the initial group "jzhz" newly selected are displayed on the first displaying part 11. On the second displaying part 12, the alternatives are displayed of the initial groups in the initial-final table D6. When the user pushes the button "j?" to select the initial-final group "j?," the displaying parts 11 and 12 are switched to the state shown as P09.

In the state P09, both the Chinese characters corresponding to the input syllables and the selected initial-final group "j?" on the first displaying part 11. On the second displaying part 12, the alternatives are displayed of syllables in the syllable table D61. When the user pushes the button "ji" to select the syllable "ji," the displaying parts 11 and 12 are switched to the state shown as P10.

In the state P10, the Chinese characters are displayed corresponding to the syllables "dianhuaji" which means a telephone set on the first displaying part 11. On the second displaying part 12, the alternatives of the initial groups in the initial table D are displayed for the next input of a syllable.

That is, the syllable "dian" is specified only by "dt," "di*," and "dian" being selected with three keystrokes. Then, the syllable "hua" is specified only by "gkh," "hu*," and "hua" being selected with three keystrokes. Further, the syllable "ji" is specified only by "jzhz," "j?," and "ji" being selected with three keystrokes.

As described above, three keystrokes specify any syllable corresponding to the standard pronunciation of a Chinese character prescribed in GB2312. The Chinese characters which are not prescribed in GB2312 are also acceptable for input, only provided that some special syllables are added in addition to m, n, hng, ng, and yo(io).

It should be noted that the Chinese input program according to the embodiment realizes the input procedure based on the initial classifying method of this invention, which is developed by taking account of the final classifying method according to the Chinese phonology as fully as possible. The procedure hence is natural and user-friendly for the users who speak and use the Chinese language. In other words, the Chinese speaking users easily learn the input procedure to utilize.

Figure 26:
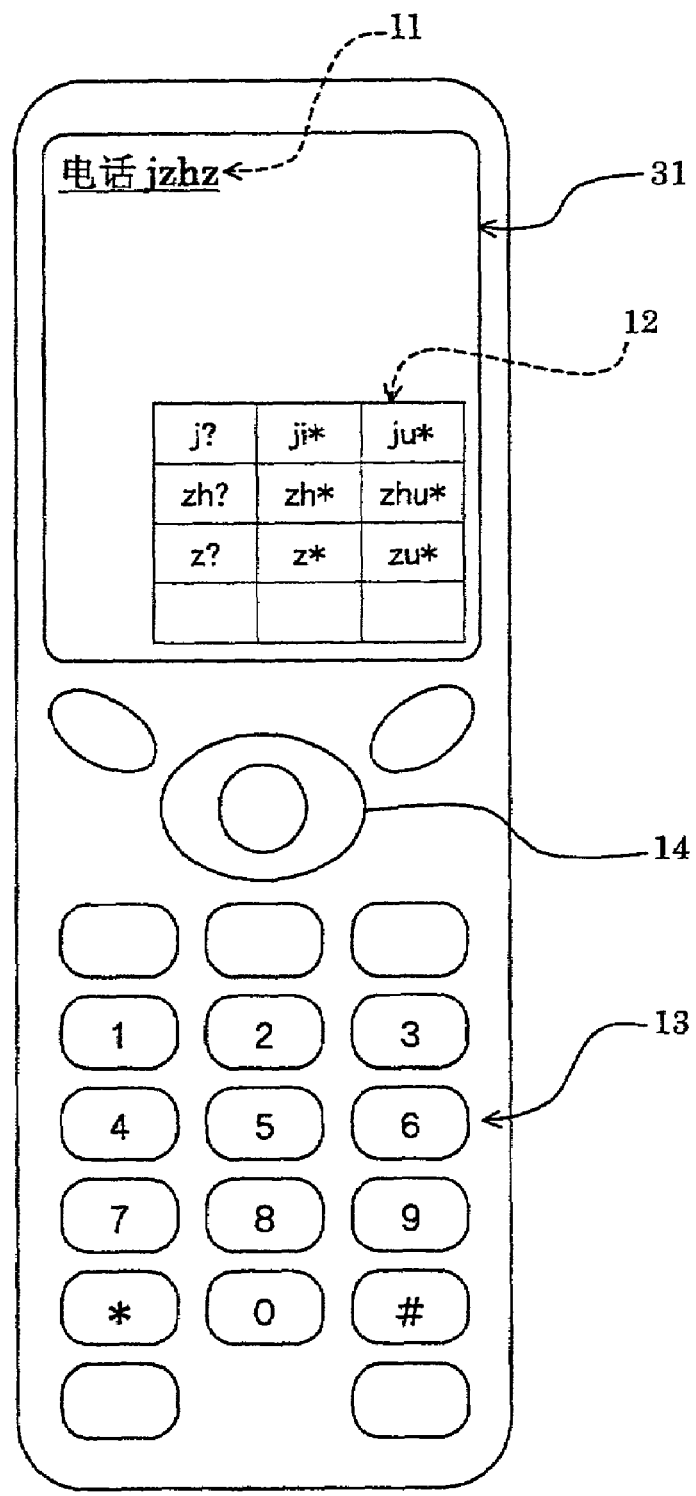
FIG. 26 is a diagram showing a schematic view of a popular type cellular phone.

The cellular phone shown in FIGS. 1 and 2 is that with a touch pad. This invention is also applicable to ordinary cellular phones. FIG. 26 is a diagram showing a schematic view of a popular type cellular phone, which has merely one liquid crystal display 31. With this architecture, items to be displayed, including the first displaying part 11 for displaying what is input and the second displaying part 12 for displaying the buttons of alternatives, should be arranged within the screen of the display 31. The user is able to input the Chinese language in the same manner as described above, by pushing the numeric keys equivalent to the input part 13 with reference to what is displayed corresponding to that on the displaying part 12.

With the Chinese language input program configured as described above, three touches of limited number of keys are sufficient to specify a syllable in the Chinese language. The Chinese characters presented for selection are narrowed down, by the corresponding syllable being uniquely specified. That enables very efficient input of the Chinese language. Besides, the Chinese language input program provides the input procedure newly developed based on the phonetics of the Chinese language. Therefore, the users easily learn the procedure to input the Chinese language.

What is claimed is:

1. A Chinese language input program embodied on a computer-readable medium comprising code segments to control a computer to execute:
   a first presentation step of presenting initial groups into which initials of the Chinese language are classified;
   an initial group specifying step of specifying one off the initial groups;
   a second presentation step of presenting initial-final groups, each including both an initial in the specified initial group and one of a plurality of final groups including finals able to be used with the initial;
   an initial-final group specifying step of specifying one of the initial-final groups;
   a third presentation step of presenting syllable definition information including finals in the specified initial-final group; and
   a syllable definition step of defining a syllable for input by specifying one of the finals in the syllable definition information;
   wherein the final groups comprise:
      a first final group including simple finals,
      a second final group including complex finals which are transcribed into groups of letters in which the first letter is a, e, or o,
      a third final group including complex finals which are transcribed into groups of letters in which the first letter is i or y,
      a fourth final group including complex finals which are transcribed into groups of letters in which the first letter is u or w, and
      a fifth final group including complex finals which are transcribed into groups of letters in which the first letter is v or the first letters are yu.

2. The program according to claim 1, further comprising a code segment to control the computer to execute;
   a step of obtaining a Chinese character based on the syllable defined in said syllable definition step.

3. The program according to claim 1, wherein said syllable definition information includes special syllables incapable of being transcribed by any initial in the initial groups and any final in the final groups.

4. The program according to claim 1, further comprising a code segment to control the computer to execute:
   a tone specifying step of specifying a tone corresponding to a syllable for input.

5. The program according to claim 4, wherein said tone specifying step is executed after said initial-final group specifying step; and
   said third presentation step makes the syllable definition information involve the tone specified in said tone specifying step, and presents the syllable definition information involving the tone.

6. The program according to claim 1, wherein said initial groups comprise:
   a first initial group including two initials transcribed into letters b and p respectively;
   a second initial group including two initials transcribed into letters m and f respectively;
   a third initial group including two initials transcribed into letters d and t respectively;
   a fourth initial group including two initials transcribed into letters n and l respectively;
   a fifth initial group including three initials transcribed into letters g, k and h respectively;
   a sixth initial group including three initials transcribed into letters j, zh and z respectively;
   a seventh initial group including three initials transcribed into letters q, ch and c respectively;
   a eighth initial group including three initials transcribed into letters x, sh and s respectively; and
   a ninth initial group including an initial transcribed into a letter r and a zero initial.

7. The program according to claim 6, wherein
said second presentation step, when the first initial group is specified in said initial group specifying step, presents initial-final groups each including one of the initials transcribed into the letters b and p respectively and one of the first, second and third final groups;
when the second initial group is specified in said initial group specifying step, presents initial-initial groups each including the initial transcribed into the letter m and one of the first, second and third final groups, and initial-final groups each including the initial transcribed into the letters f and one of the first and second final groups;
when the third initial group is specified in said initial group specifying step, presents initial-final groups each including one of the initials transcribed into the letters d and t respectively and one of the first, second, third and fourth final groups;
when the fourth initial group is specified in said initial group specifying step, presents initial-final groups each including one of the initials transcribed into the letters n and l respectively and one of the first, second, third, fourth and fifth final groups;
when the fifth initial group is specified in said initial group specifying step, presents initial-final groups each including one of the initials transcribed into the letters g, k and h respectively and one of the first, second and fourth final groups;
when the sixth initial group is specified in said initial group specifying step, presents initial-final groups each including the initial transcribed into the letter j and one of the first, third and fifth finals, and initial-final groups each including one of the initials transcribed into the letters zh and z respectively and one of the first, second and fourth final groups;
when the seventh initial group is specified in said initial group specifying step, presents initial-final groups each including the initial transcribed into the letter q and one of the first, third and fifth finals, and initial-final groups each including one of the initials transcribed into the letters ch and c respectively and one of the first, second and fourth final groups;
when the eighth initial group is specified in said initial group specifying step, presents initial-final groups each including the initial transcribed into the letter x and one of the first, third and fifth finals, and initial-final groups each including one of the initials transcribed into the letters sh and s respectively and one of the first, second and fourth final groups;
when the ninth initial group is specified in said initial group specifying step, presents initial-final groups each including the initial transcribed into the letter r and one of the first, second and fourth final groups, and initial-final groups each including the zero initial and one of the first, second, third, fourth and fifth final groups.

8. A Chinese language input apparatus comprising:
an input part having keys;
a displaying part for displaying information;
a controller for executing program-based processing, said controller being connected to both the input part and the displaying part; and a storing device which contains a Chinese language input program comprising code segments to control the computer to execute:
- a first presentation step of presenting initial groups into which initials of the Chinese language are classified;
- an initial group specifying step of specifying one of the initial groups,
- a second presentation step of presenting initial-final groups, each including both an initial in the specified initial group and one of a plurality of final groups including finals able to be used with the initial,
- an initial-final group specifying step of specifying one of the initial-final groups,
- a third presentation step of presenting syllable definition information including finals in the specified initial-final group, and
- a syllable definition step of defining a syllable for input by specifying one of the finals in the syllable definition information;

wherein the final groups comprise:
- a first final group including simple finals,
- a second final group including complex finals which are transcribed into groups of letters in which the first letter is a, e, or o,
- a third final group including complex finals which are transcribed into groups of letters in which the first letter is i or y,
- a fourth final group including complex finals which are transcribed into groups of letters in which the first letter is u or w, and
- a fifth final group including complex finals which are transcribed into groups of letters in which the first letter is v or the first letters are yu.

9. The apparatus according to claim 8, wherein said program further comprises a code segment to control the computer to execute:
a step of obtaining a Chinese character based on the syllable defined in said syllable definition step.

10. The apparatus according to claim 8, wherein
said syllable definition information includes special syllables incapable of being transcribed by any initial in the initial groups and any final in the final groups.

11. The apparatus according to claim 8, wherein said program further comprises a code segment to control the computer to execute:
a tone specifying step of specifying a tone corresponding to a syllable for input.

12. A Chinese language input method comprising:
- a first presentation step of presenting initial groups into which initials of the Chinese language are classified;
- an initial group specifying step of specifying one of the initial groups;
- a second presentation step of presenting initial-final groups, each including both an initial in the specified initial group and one of a plurality of final groups including finals able to be used with the initial;
- an initial-final group specifying step of specifying one of the initial-final groups;
- a third presentation step of presenting syllable definition information including finals in the specified initial-final group; and
- a syllable definition step of defining a syllable for input by specifying one of the finals in the syllable definition information;

wherein the final groups comprise:
- a first final group including simple finals,
- a second final group including complex finals which are transcribed into groups of letters in which the first letter is a, e, or o,
- a third final group including complex finals which are transcribed into groups of letters in which the first letter is i or y,
- a fourth final group including complex finals which are transcribed into groups of letters in which the first letter is u or w, and
- a fifth final group including complex finals which are transcribed into groups of letters in which the first letter is v or the first letters are yu.

13. The method according to claim 12, further comprising:
a step of obtaining a Chinese character based on the syllable defined in said syllable definition step.

14. The method according to claim 12, wherein
said syllable definition information includes special syllables incapable of being transcribed by an initial in the initial groups and any final in the final groups.

15. The method according to claim 12, further comprising:
a tone specifying step of specifying a tone corresponding to a syllable for input.

16. A Chinese language input program embodied on a computer-readable medium comprising code segments to control a computer to execute:
- a first presentation step of presenting initial groups into which initials of the Chinese language are classified;
- an initial group specifying step of specifying one of the initial groups;
- a second presentation step of presenting initial-final groups, each including both an initial in the specified initial group and one of a plurality of final groups including finals able to be used with the initial, said final groups comprising a single final group, including simple finals, and a plurality of complex final groups which are distinguished from one another by a first letter of Pinyin with which their included complex finals are transcribed;
- an initial-final group specifying step of specifying one of the initial-final groups;
- a third presentation step of presenting syllable definition information including finals in the specified initial-final group; and
- a syllable definition step of defining a syllable for input by specifying one of the finals in the syllable definition information.

17. A Chinese language input apparatus comprising:
- an input part having keys;
- a displaying part for displaying information;
- a controller for executing program-based processing, said controller being connected to both the input part and the displaying part; and
- a storing device which contains a Chinese language input program comprising code segments to control the computer to execute:
  - a first presentation step of presenting initial groups into which initials of the Chinese language are classified,
  - an initial group specifying step of specifying one of the initial groups,
  - a second presentation step of presenting initial-final groups, each including both an initial in the specified initial group and one of a plurality of final groups including finals able to be used with the initial, said final groups comprising a single final group, including simple finals, and a plurality of complex final groups which are distinguished from one another by a first letter of Pinyin with which their included complex finals are transcribed, an initial-initial group specifying step of specifying one of the initial-final groups, a third presentation step of presenting syllable definition information including finals in the specified initial-final group, and a syllable definition step of defining a syllable for input by specifying one of the finals in the syllable definition information.

18. A Chinese language input method comprising:

a first presentation step of presenting initial groups into which initials of the Chinese language are classified;

an initial group specifying step of specifying one of the initial groups;

a second presentation step of presenting initial-final groups, each including both an initial in the specified initial group and one of a plurality of final groups including finals able to be used with the initial, said final groups comprising a single final group, including simple finals, and a plurality of complex final groups which are distinguished from one another by a first letter of Pinyin with which their included complex finals are transcribed;

an initial-final group specifying step of specifying one of the initial-final groups;

a third presentation step of presenting syllable definition information including finals in the specified initial-final group; and a syllable definition step of defining a syllable for input by specifying one of the finals in the syllable definition information.

19. A Chinese language input method comprising:

presenting initial groups into which initials of the Chinese language are classified;

specifying one of the initial groups;

presenting initial-final groups, each including both an initial in the specified initial group and one of a plurality of final groups including finals able to be used with the initial;

specifying one of the initial-final groups;

presenting syllable definition information including finals in the specified initial-final group; and defining a syllable for input by specifying one of the finals in the syllable definition information;

wherein no more than fifteen specification choices are presented in any of the presentations.

* * * * *

UNITED STATES PATENT AND TRADEMARK OFFICE
CERTIFICATE OF CORRECTION

PATENT NO. : 7,165,021 B2 Page 1 of 1
APPLICATION NO. : 09/968010
DATED : January 16, 2007
INVENTOR(S) : Jin Sugano It is certified that error appears in the above-identified patent and that said Letters Patent is hereby corrected as shown below:

Column 19, Line 7, change "off" to --of--.

Column 19, Line 36, change "execute;" to --execute:--.

Column 20, Line 14, change "initial-initial" to --initial-final--.

Column 21, Line 5, change "classified;" to --classified,--.

Column 22, Line 19, change "an" to --any--.

Column 23, Line 4, change "initial-initial" to --initial-final--.

Signed and Sealed this

First Day of April, 2008

JON W. DUDAS
*Director of the United States Patent and Trademark Office*